US012363429B2

(12) United States Patent
Wang

(10) Patent No.: US 12,363,429 B2
(45) Date of Patent: Jul. 15, 2025

(54) FOCUSING METHOD AND APPARATUS FOR SYNTHESIZING MULTIPLE IMAGES

(71) Applicant: VIVO MOBILE COMMUNICATION CO., LTD., Dongguan (CN)

(72) Inventor: Chao Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 70 days.

(21) Appl. No.: 18/227,272

(22) Filed: Jul. 27, 2023

(65) Prior Publication Data

US 2023/0370720 A1 Nov. 16, 2023

Related U.S. Application Data

(63) Continuation of application No. PCT/CN2022/073035, filed on Jan. 20, 2022.

(30) Foreign Application Priority Data

Jan. 27, 2021 (CN) .......................... 202110113859.3

(51) Int. Cl.
*H04N 23/67* (2023.01)
*H04N 23/63* (2023.01)
*H04N 23/69* (2023.01)

(52) U.S. Cl.
CPC ........... *H04N 23/67* (2023.01); *H04N 23/632* (2023.01); *H04N 23/69* (2023.01)

(58) Field of Classification Search
CPC ...... H04N 23/67; H04N 23/632; H04N 23/69; H04N 23/61; H04N 23/633; H04N 23/64; H04N 23/683; H04N 23/951; H04N 23/62

See application file for complete search history.

(56) References Cited

U.S. PATENT DOCUMENTS

2011/0109771 A1* 5/2011 Onomura ............. H04N 23/635
                                                      348/E5.055
2016/0353012 A1* 12/2016 Kao ...................... H04N 23/632
(Continued)

FOREIGN PATENT DOCUMENTS

CN        101621622 A     1/2010
CN        102055908 A     5/2011
(Continued)

OTHER PUBLICATIONS

Extended European Search Report issued in related European Application No. 22745135.8, mailed Jun. 18, 2024, 11 pages.
(Continued)

*Primary Examiner* — Padma Haliyur
(74) *Attorney, Agent, or Firm* — IPX PLLC

(57) ABSTRACT

This application discloses a focusing method and apparatus, an electronic device, and a medium. The focusing method includes: receiving first input when a first preview image captured based on a first zoom ratio is displayed, where the first input is used for triggering an update of the first zoom ratio to a second zoom ratio, the first zoom ratio is less than the second zoom ratio, and the first preview image includes an image of a target object; capturing N images based on the first zoom ratio in response to the first input; capturing an image of the target object from each of the N images based on the second zoom ratio, to obtain N sub-images; and synthesizing the N sub-images into a second preview image, and displaying the second preview image, where N is an integer greater than 1.

17 Claims, 13 Drawing Sheets

(56) References Cited

U.S. PATENT DOCUMENTS

| | | | | |
|---|---|---|---|---|
| 2017/0280052 | A1* | 9/2017 | Zhou | H04N 25/702 |
| 2019/0045135 | A1* | 2/2019 | Ryu | H04N 23/635 |
| 2019/0082101 | A1* | 3/2019 | Baldwin | H04N 5/772 |
| 2021/0168300 | A1* | 6/2021 | Wang | H04N 23/698 |
| 2022/0321797 | A1* | 10/2022 | Bian | H04N 23/635 |
| 2022/0394190 | A1* | 12/2022 | Cui | H04N 23/635 |
| 2023/0019164 | A1* | 1/2023 | Wang | H04N 23/635 |
| 2023/0094025 | A1* | 3/2023 | Jiang | H04N 23/90 348/333.11 |
| 2023/0370720 | A1* | 11/2023 | Wang | H04N 23/683 |

FOREIGN PATENT DOCUMENTS

| | | | | | |
|---|---|---|---|---|---|
| CN | 105450924 | A | | 3/2016 | |
| CN | 106791016 | A | | 5/2017 | |
| CN | 107750451 | A | | 3/2018 | |
| CN | 108536364 | A | | 9/2018 | |
| CN | 110706150 | A | | 1/2020 | |
| CN | 111294517 | A | * | 6/2020 | H04N 23/45 |
| CN | 111447359 | A | | 7/2020 | |
| CN | 111541845 | A | | 8/2020 | |
| CN | 111970439 | A | | 11/2020 | |
| CN | 112183353 | A | | 1/2021 | |
| CN | 112954195 | A | | 6/2021 | |
| CN | 113497881 | A | * | 10/2021 | H04N 23/60 |
| JP | 2010079005 | A | | 4/2010 | |
| WO | WO-2021082711 | A1 | * | 5/2021 | G06F 3/0481 |

OTHER PUBLICATIONS

Decision of Reexamination issued in related Chinese Application No. 202110113859.3, mailed May 23, 2024, 13 pages.

International Search Report issued in corresponding International Application No. PCT/CN2022/073035, mailed Apr. 12, 2022, 5 pages.

First Office Action issued in related Chinese Application No. 202110113859.3, mailed Mar. 14, 2022, 4 pages.

Second Office Action issued in related Chinese Application No. 202110113859.3, mailed Aug. 26, 2022, 6 pages.

* cited by examiner

FOCUSING METHOD AND APPARATUS FOR SYNTHESIZING MULTIPLE IMAGES

CROSS-REFERENCE TO RELATED APPLICATIONS

This application is a continuation of International Application No. PCT/CN2022/073035, filed Jan. 20, 2022, which claims priority to Chinese Patent Application 202110113859.3, filed Jan. 27, 2021. The entire contents of each of the above-referenced applications are expressly incorporated herein by reference.

TECHNICAL FIELD

This application relates to the field of photographing technologies, and specifically, relates to a focusing method and apparatus, an electronic device, and a medium.

BACKGROUND

A zoom function, also referred to as a zoom-in-and-out function, has become an indispensable function of a terminal device. The focal length of a lens may be changed through a change of a lens combination, so that a size of an object in an image is changed, and zoom-in and zoom-out effects are achieved. Usually, focusing needs to be performed after zooming, and therefore is referred to zoom-focusing.

Currently, a center focusing manner is usually used in zoom-focusing. After receiving a zoom-in operation performed by a user on an initial preview interface, a terminal device starts to enlarge an image at a center point of the initial preview interface. However, when an object of the user's interest is not at the center point of the initial preview interface, a recaptured preview interface may not include the object. Therefore, the user may need to move the terminal device back and forth in directions such as up, down, left, and right, so that the object is at the center point of the initial preview interface, and the recaptured preview interface includes the object. As a result, a zoom-focusing process is complex.

SUMMARY

An objective of embodiments of this application is to provide a focusing method and apparatus, an electronic device, and a medium.

According to a first aspect, embodiments of this application provide a focusing method. The method includes: receiving first input in a case that a first preview image captured based on a first zoom ratio is displayed, where the first input is used for triggering an update of the first zoom ratio to a second zoom ratio, the first zoom ratio is less than the second zoom ratio, and the first preview image includes an image of a target object; capturing N images based on the first zoom ratio in response to the first input; capturing an image of the target object from each of the N images based on the second zoom ratio, to obtain N sub-images; and synthesizing the N sub-images into a second preview image, and displaying the second preview image, where N is an integer greater than 1.

According to a second aspect, embodiments of this application provide a zoom-focusing apparatus. The apparatus includes a receiving module, a capture module, a processing module, and a display module. The receiving module is configured to receive first input in a case that the display module displays a first preview image captured based on a first zoom ratio, where the first input is used for triggering an update of the first zoom ratio to a second zoom ratio, the first zoom ratio is less than the second zoom ratio, and the first preview image includes an image of a target object. The capture module is configured to capture N images based on the first zoom ratio in response to the first input received by the receiving module. The processing module is configured to: capture, based on the second zoom ratio, an image of the target object from each of the N images captured by the capture module, to obtain N sub-images, and synthesize the N sub-images into a second preview image. The display module is configured to display the second preview image obtained by the processing module through synthesis. N is an integer greater than 1.

According to a third aspect, embodiments of this application provide an electronic device, where the electronic device includes a processor, a memory, and a program or instructions stored in the memory and capable of running on the processor, and when the program or instructions are executed by the processor, the steps of the method provided in the first aspect are implemented.

According to a fourth aspect, embodiments of this application provide a readable storage medium, where the readable storage medium stores a program or instructions, and when the program or instructions are executed by a processor, the steps of the method provided in the first aspect are implemented.

According to a fifth aspect, embodiments of this application provide a chip, where the chip includes a processor and a communications interface, the communications interface is coupled to the processor, and the processor is configured to run a program or instructions to implement the method provided in the first aspect.

According to a sixth aspect, embodiments of this application provide a computer program product, where the computer program product is executed by at least one processor to implement the method provided in the first aspect.

In the embodiments of this application, first input may be received in a case that a first preview image captured based on a first zoom ratio is displayed, where the first input is used for triggering an update of the first zoom ratio to a second zoom ratio, the first zoom ratio is less than the second zoom ratio, and the first preview image includes an image of a target object; N images are captured based on the first zoom ratio in response to the first input; an image of the target object is captured from each of the N images based on the second zoom ratio, to obtain N sub-images; and the N sub-images are synthesized into a second preview image, and the second preview image is displayed. In this solution, the first preview image captured based on the first zoom ratio includes the image of the target object. Therefore, when a user increases a zoom ratio of a lens from the first zoom ratio to the second zoom ratio, a plurality of images may be captured based on the first zoom ratio, a sub-image of the target object is captured from each of the plurality of images based on the second zoom ratio, and a plurality of captured sub-images are synthesized into the second preview image. In this way, after zoom-focusing is performed, the image of the target object can be located in a center area of the second preview image, and the user does not need to manually change a location of a terminal device, thereby simplifying a zoom-focusing process.

DETAILED DESCRIPTION

Figure 1:
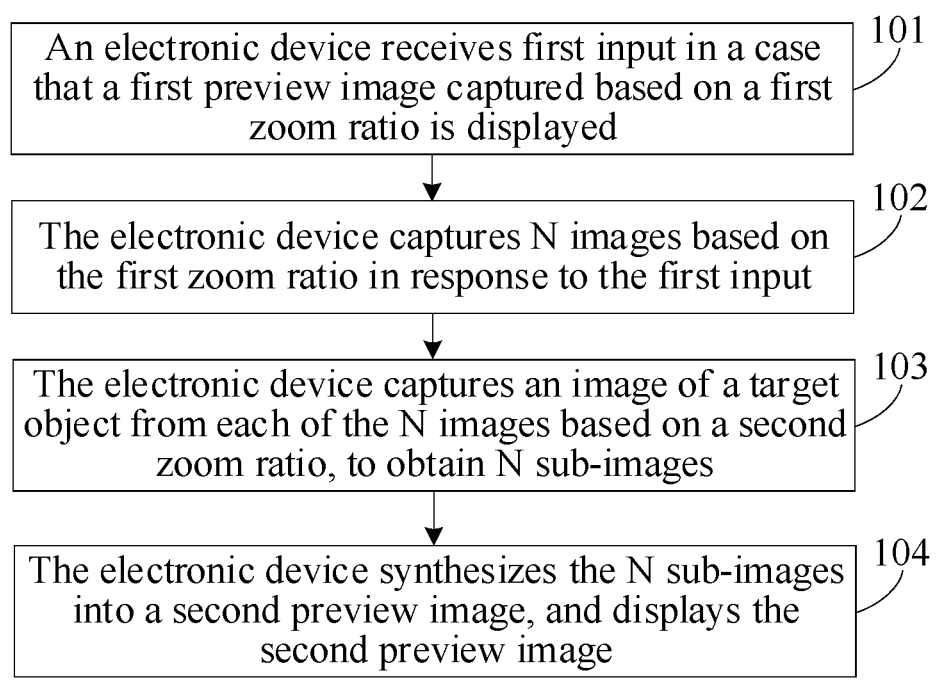
FIG. 1 is a schematic diagram of a focusing method according to an embodiment of this application.

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in the specification and claims of this application are used to distinguish between similar objects instead of describing a specific order or sequence. It should be understood that the data used in this way is interchangeable in appropriate circumstances, so that the embodiments of this application can be implemented in an order other than the order illustrated or described herein. In addition, the objects distinguished by "first", "second", and the like usually belong to one category, and the number of objects is not limited. For example, there may be one or more first objects. In addition, in the specification and claims, "and/or" represents at least one of connected objects, and the character "/" typically represents an "or" relationship between the associated objects.

The following describes terms used in the embodiments of the present application.

Zoom: Zoom usually means changing the focal length of a lens through a change of a lens combination, to change an angle of view. A longer focal length of the lens indicates a larger zoom ratio, a smaller angle of view, a smaller quantity of scenes that can be included in an image, and that the image looks closer. A shorter focal short of the lens indicates a smaller zoom ratio, a greater angle of view, a larger quantity of scenes that can be included in an image, and that the image looks farther away. For example, an electronic device provides 0.5×, 1×, and 2×. 1× indicates 1× zoom, and corresponds to a conventional photographing mode. 0.5× indicates 0.5× zoom, and corresponds to a panoramic photographing mode. Compared with 1×, a size of a photographed scene is halved. 2× indicates 2× zoom, and corresponds to a close photographing mode. Compared with 1×, a size of a photographed scene is doubled.

Focusing: Focusing means changing an image distance by adjusting a distance between an imaging plane and a lens without changing a focal length of the lens, so that a distance between the imaging plane and an optical center is equal to the image distance, and an image of an object can be clearly formed on a photosensitive element. A process of adjusting the lens for clear imaging of the shooting object is a focusing process. If an imaging location deviates from a plane on which the photosensitive element is located, a formed image is blurry, that is, an out-of-focus phenomenon occurs during photographing.

A zoom-in (zoom in) operation means increasing the zoom ratio of a lens to reduce a photographing angle of view, so as to increase a size of a scene in a photographing image. A zoom-out (zoom out) operation means reducing the zoom ratio of a lens to increase a photographing angle of view, so as to reduce a size of a scene in a photographing image.

It should be noted that identifiers in the embodiments of this application are used for indicating text, symbols, images, and the like of information, controls or other containers may be used as carriers for displaying information, and the identifiers include but are not limited to text identifiers, symbol identifiers, and image identifiers.

The embodiments of this application provide a focusing method. First input may be received in a case that a first preview image captured based on a first zoom ratio is displayed, where the first input is used for triggering an update of the first zoom ratio to a second zoom ratio, the first zoom ratio is less than the second zoom ratio, and the first preview image includes an image of a target object. N images are captured based on the first zoom ratio in response to the first input. An image of the target object is captured from each of the N images based on the second zoom ratio, to obtain N sub-images. The N sub-images are synthesized into a second preview image, and the second preview image is displayed. In this solution, the first preview image captured based on the first zoom ratio includes the image of the target object. Therefore, when a user increases a zoom ratio of a lens from the first zoom ratio to the second zoom ratio, a plurality of images may be captured based on the first zoom ratio, a sub-image of the target object is captured from each of the plurality of images based on the second zoom ratio, and a plurality of captured sub-images are synthesized into the second preview image. In this way, after zoom-focusing is performed, the image of the target object can be located in a center area of the second preview image, and the user does not need to manually change a location of a terminal device, thereby simplifying a zoom-focusing process.

The following describes in detail a focusing method and apparatus and an electronic device in the embodiments of this application with reference to the accompanying drawings and by using embodiments and application scenarios thereof.

FIG. 1 shows a focusing method according to an embodiment of this application. The method may include the following step 101 to step 104.

Step 101: An electronic device receives a first input in a case that a first preview image captured based on a first zoom ratio is displayed.

The first input may be used for triggering an update of the first zoom ratio to a second zoom ratio, where the first zoom ratio is less than the second zoom ratio. That is, the first input is input for increasing a zoom ratio. The first preview image includes an image of a target object.

Usually, after the electronic device runs a camera application in response to input performed by a user on a camera application icon by using a finger or a touch apparatus such as a stylus, or in response input performed by a user on a camera application control in an application, the electronic device captures a preview image at an interval of preset time based on a preset target zoom ratio, and updates display of a preview image on a preview interface of the camera application.

In some embodiments, the target object may be a person, a building, an animal, a plant, natural scenery, or the like. This is not limited in embodiments of this application. The first preview image may include images of a plurality of shooting objects, and the target object may be at least one of the plurality of shooting objects.

In some embodiments, the first zoom ratio is the target zoom ratio, that is, the first preview image is a preview image captured based on the preset target zoom ratio; or the first zoom ratio is a zoom ratio other than the target zoom ratio, that is, the first preview image is a preview image captured based on a first zoom ratio manually set by the user.

Figure 2:
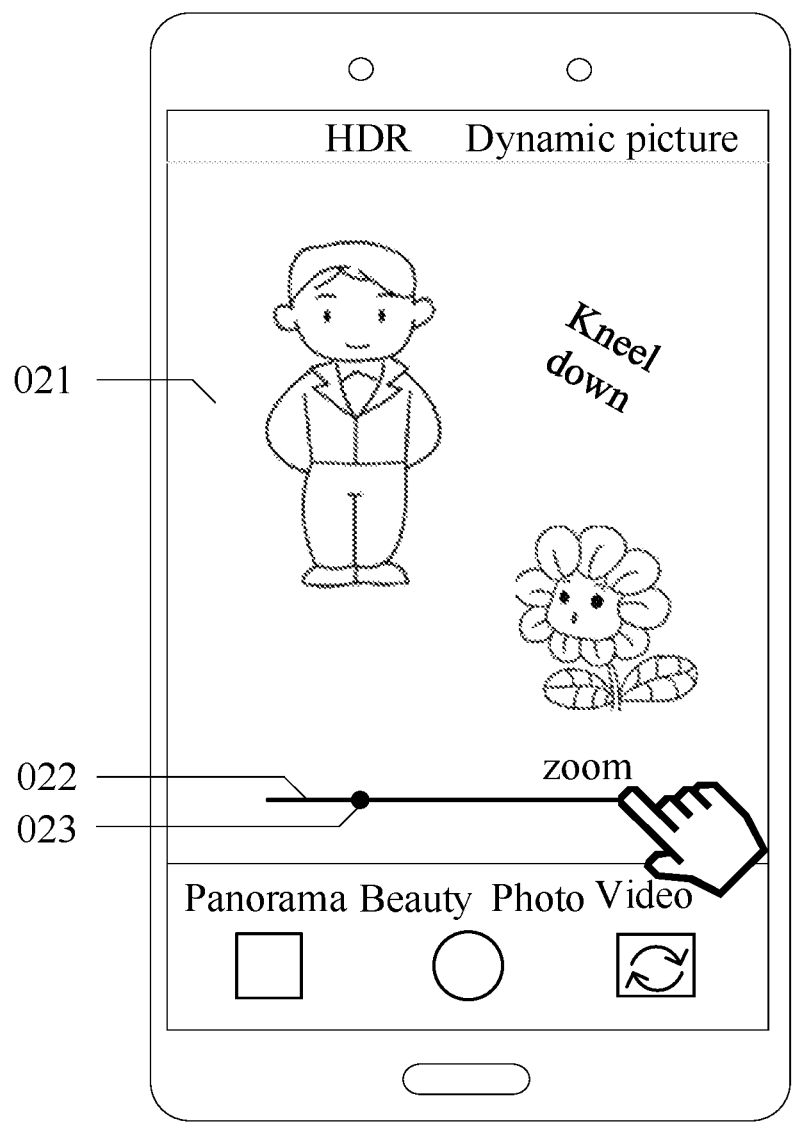
FIG. 2 is a schematic diagram of an operation of adjusting a zoom ratio according to an embodiment of this application.

For example, as shown in FIG. 2, the preview interface of the camera application includes a preview image 021 and a plurality of function controls such as a zoom control, a panorama control, a beauty control, a photo control, and a video control. The zoom control includes a progress bar 022 and an indicator control 023. In some embodiments, when the user drags the indicator control 023 on the progress bar 022 along a direction from left to right, the electronic device increases a zoom ratio of a lens in response to the drag operation, to reduce a photographing angle of view of a camera, and increase a size of a photographed scene in a preview image; or when the user drags the indicator control 023 on the progress bar 022 along a direction from right to left, the electronic device reduces a zoom ratio of a lens in response to the drag operation, to increase a photographing angle of view of a camera, and reduce a size of a photographed scene in a preview image.

Step 102: The electronic device captures N images based on the first zoom ratio in response to the first input.

In some embodiments of this application, N is an integer greater than or equal to 2. The electronic device may capture a plurality of images based on the first zoom ratio. This avoids blurring or shadowing of an individual image caused by manual shaking of the user or movement of the shooting object, and further avoids poor image quality of a second preview image obtained through synthesis based on the individual image. That is, a plurality of images are captured, so that image quality of the second preview image obtained through synthesis based on the captured images can be improved. It can be understood that a larger value N indicates a larger quantity of captured second images and a smaller error caused by accidental factors such as shaking of the user, so that an image of a target shooting object in the second preview image finally obtained through synthesis better meets a zoom requirement of the user. For steps of obtaining the second preview image through synthesis based on captured images, refer to descriptions in the following embodiments. Details are not described herein.

In some embodiments, the value N may be preset in a system, or may be preset by the user. This is not limited in embodiments of this application.

In some embodiments, a preset zoom ratio is set, and the preset zoom ratio is greater than the preset target zoom ratio. When the zoom ratio of the electronic device is greater than or equal to the preset zoom ratio, it can be determined that the user is performing a zoom-in operation on a preview image. Assuming that an object of the user's interest is not located in a center area of a preview interface at an initial moment, if a focusing method provided in the conventional technology is used for performing zoom-in on the preview interface, the object of the user's interest may move out of the preview interface, that is, a zoom requirement of the user cannot be met. Therefore, the focusing method provided in embodiments of this application may be used for performing zoom-in on the preview interface. That is, step 102 may include: In a case that the second zoom ratio is greater than or equal to the preset zoom ratio, the electronic device captures the N images based on the first zoom ratio in response to the first input.

Further, after the first input is received, when the zoom ratio of the electronic device is less than the preset zoom ratio, a zoom-in degree of a preview image is small. In this case, a zoom requirement of the user can also be met in a case that the focusing method provided in the conventional technology is used for performing zoom-in on the preview interface. That is, the focusing method provided in embodiments of this application may further include: In a case that the second zoom ratio is less than the preset zoom ratio, the electronic device captures an image based on the second zoom ratio in response to the first input.

For example, it is assumed that the target zoom ratio is 1× and the preset zoom ratio is 1.5×. At an initial moment, the electronic device may capture a preview image based on the 1× zoom ratio. Subsequently, if the user adjusts the zoom ratio to a 2× zoom ratio, the electronic device may continuously capture a plurality of images based on the 2× zoom ratio because the 2× zoom ratio is greater than the preset zoom ratio; or if the user adjusts the zoom ratio to a 1.2× zoom ratio, the electronic device may capture at least one image based on the 1.2× zoom ratio because the 1.2× zoom ratio is less than the preset zoom ratio.

The focusing method provided in embodiments of this application is applied to a zoom ratio adjustment scenario. In a case that the second zoom ratio is greater than or equal to the preset zoom ratio, a plurality of images may be captured based on the first zoom ratio, and the second preview image is obtained through synthesis based on the captured images; or in a case that the second zoom ratio is less than the preset zoom ratio, focusing may be performed according to a conventional focusing method. Different focusing methods may be used for zoom-focusing based on a magnitude relationship between the second zoom ratio and the preset zoom ratio, that is, a zoom-in degree of a preview image, thereby improving flexibility and diversity of zoom-focusing.

In addition, after receiving the first input from the user, and before capturing the N images based on the first zoom ratio, the electronic device may output prompt information to prompt the user to keep a current holding gesture, so that a spatial location and a spatial posture of the electronic device can remain unchanged. In this way, it can be ensured that locations of the image of the target object in the N images are the same as or similar to a location of the image of the target object in the first preview image, so that accuracy of the zoom-focusing method provided in this application can be improved.

Step 103: The electronic device captures an image of the target object from each of the N images based on the second zoom ratio, to obtain N sub-images.

In some embodiments, in a case that the first preview image captured based on the first zoom ratio is displayed, the user may perform input on the first preview image, to select the target object from a plurality of shooting objects recognized from the first preview image, and calculate a location of an image including the target object in the first preview image and a size of the image of the target object. Refer to descriptions in the following embodiments. Details are not described herein.

Therefore, after capturing, based on the first zoom ratio, the N images including the image of the target object, for each of the N images, the electronic device may capture an image of the target object from the image based on the second zoom ratio, a size of the image, and the image of the target object in the first preview image.

Step 103 is described by using an example in which an $i^{th}$ image is captured from the N images. Step 103 may include step a, step b, step c, and step d, or include step a, step b, step c, and step e. That is, one of step d or step e is performed.

Step a: The electronic device determines, in the $i^{th}$ image of the N images, a target area corresponding to the target object, where a size of the target area is equal to that of a first area, the first area is an area corresponding to the target object in the first preview image, and a value of i ranges from 1 to N.

It should be noted that, that "the first area is an area corresponding to the target object in the first preview image" means that an image of the first area is the image of the target object in the first preview image. That is, if the image of the first area is captured, the captured image is the image of the target object.

In some embodiments, sizes of the first preview image and each of the N images are the same. For example, sizes of the first preview image and the N images are 640p×480p.

In some embodiments of this application, the electronic device may obtain information about the first area by using a preset algorithm, and the information about the first area may be used for indicating a location and a size of the image of the target object in the first preview image. Because the sizes of the first preview image and each of the N images are the same, the electronic device may determine, in the $i^{th}$ image of the N images based on the information about the first area, the target area corresponding to the target object. A location of the image of the target object in the $i^{th}$ image is the same as the location of the image of the target object in the first preview image, and a size of the image of the target object in the $i^{th}$ image is the same as the size of the image of the target object in the first preview image.

Figure 3:
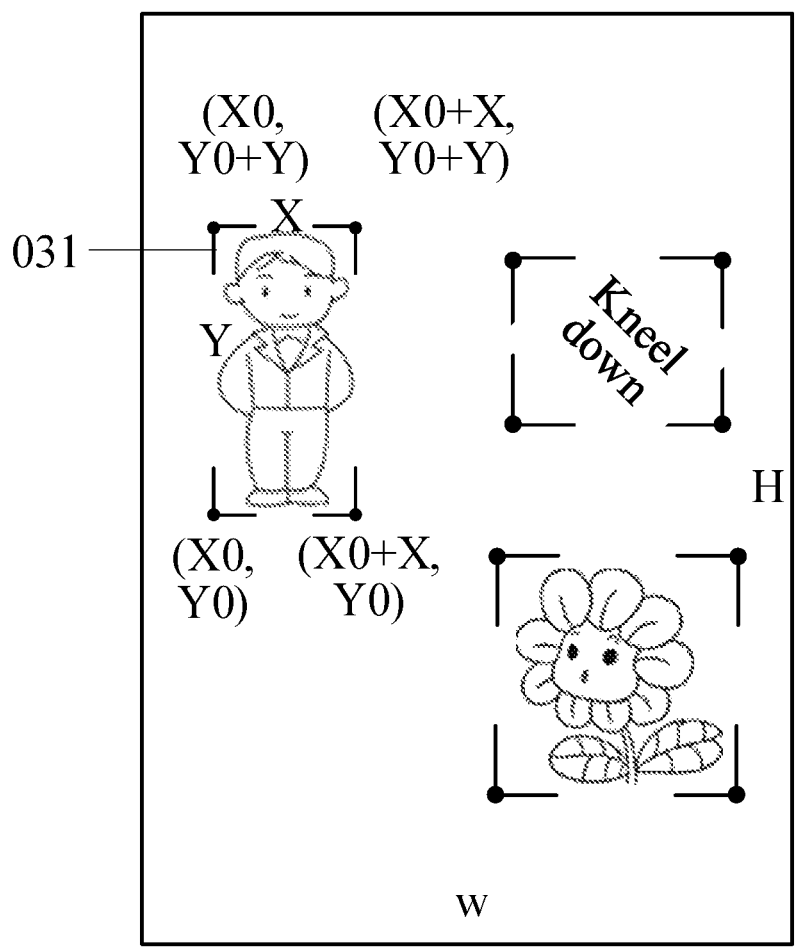
FIG. 3 is a schematic diagram of a shooting object of a first preview image according to an embodiment of this application.
Figure 4A:
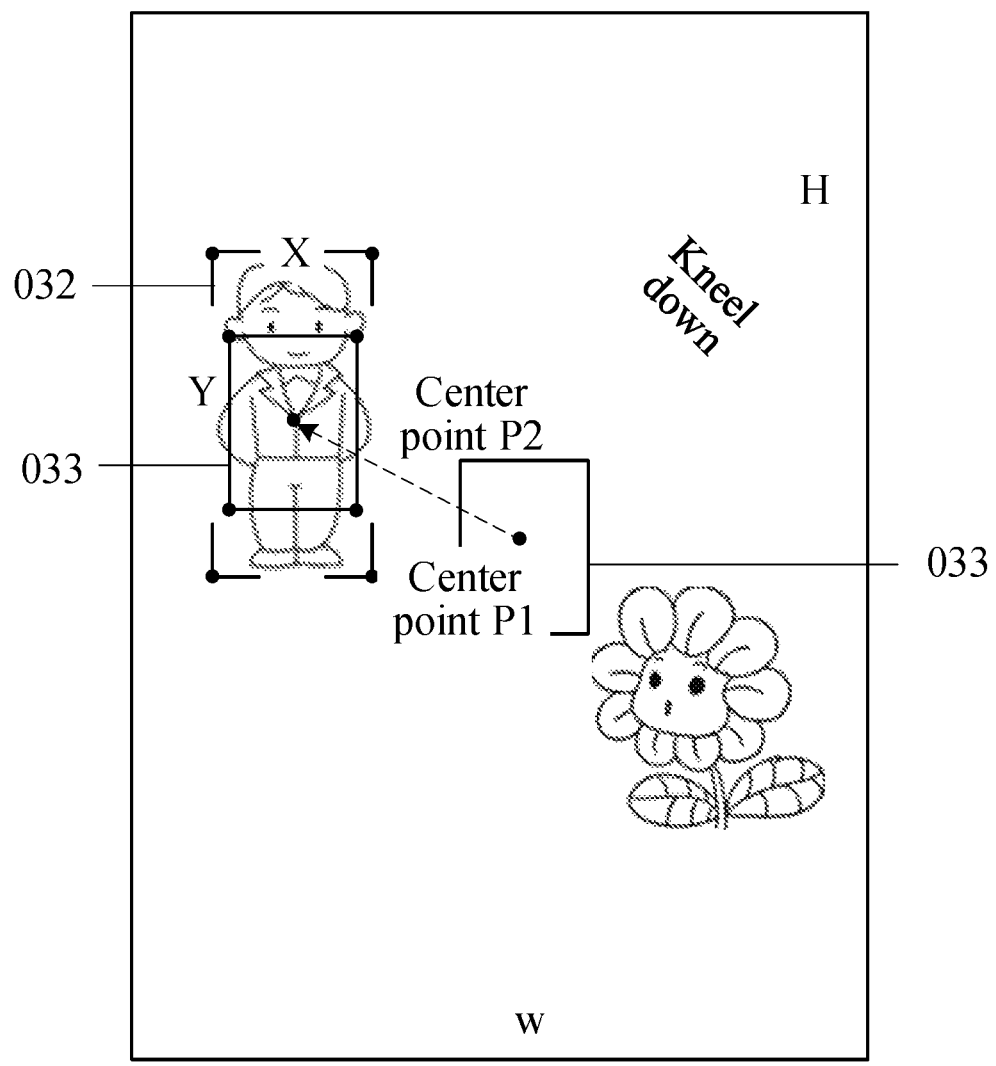
FIG. 4A is a first schematic diagram of determining a target area and a focusing area according to an embodiment of this application.
Figure 4B:
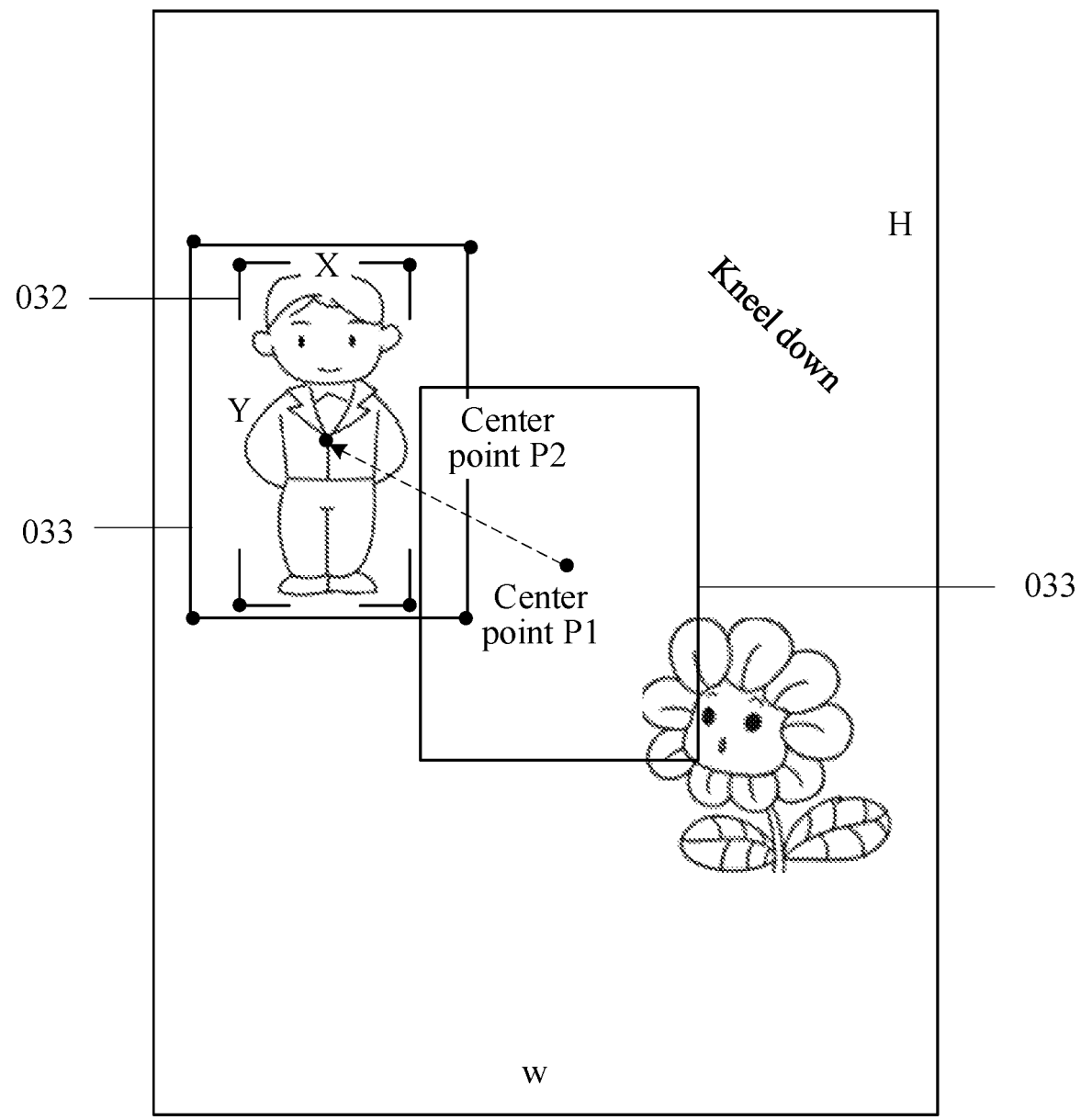
FIG. 4B is a second schematic diagram of determining a target area and a focusing area according to an embodiment of this application.

For example, the target object is a "person". It is assumed that the first preview image and the N images have a width of W and a height of H, and use a same coordinate system. As shown in FIG. 3, an image of the "person" is in an area 031 in the first preview image, and coordinates of four vertices of the area 031 are (X0, Y0), (X0+X, Y0), (X0, Y0+Y), and (X0+X, Y0+Y). As shown in FIG. 4A or FIG. 4B, the image of the "person" is in an area 032 in the $i^{th}$ image of the N images captured based on the second zoom ratio, and coordinates of four vertices of the area 032 are (X0, Y0), (X0+X, Y0), (X0, Y0+Y), and (X0+X, Y0+Y).

Step b: The electronic device determines a zoom area in the $i^{th}$ image based on the second zoom ratio, a width of the $i^{th}$ image, and a height of the $i^{th}$ image, where a center point of the zoom area coincides with a center point of the target area.

In some embodiments, the target area and the zoom area in the $i^{th}$ image are rectangular areas, or the target area and the zoom area in the $i^{th}$ image are circular areas. In some embodiments, the target area and the zoom area may be in another shape. This is not limited in embodiments of this application. The $i^{th}$ image is any one of the N images.

For example, the target area and the zoom area of the $i^{th}$ image are rectangular areas. The center of the target area is an intersection of two diagonal lines of a rectangular area, and a center of the zoom area is an intersection of two diagonal lines of another rectangular area. Center points of the two rectangular areas coincide with each other. It can be understood that, because the center point of the zoom area coincides with the center point of the target area and both the zoom area and the target area are images of the target object, the target object can be at a center location in a preview image obtained through focusing.

In some embodiments, an implementation of determining, by the electronic device, a size of the zoom area in the $i^{th}$ image is as follows: determining a first ratio of the width of the $i^{th}$ image to the second zoom ratio as a width of the zoom area of the $i^{th}$ image; and determining a second ratio of the height of the $i^{th}$ image to the second zoom ratio as a height of the zoom area of the $i^{th}$ image.

It is assumed that the width of the $i^{th}$ image is denoted as W, the height of the $i^{th}$ image is denoted as H, the second zoom ratio is denoted as zoomratio, the width of the zoom area in the $i^{th}$ image is denoted as Cropwidth, and the height of the zoom area in the $i^{th}$ image is denoted as Cropheight. In this cases: the following formulas exist:

Cropwidth=$W$/zoomratio; and

Cropheight=$H$/zoomratio.

Therefore, the width of the zoom area in the $i^{th}$ image is W/zoomratio; and the height of the zoom area in the $i^{th}$ image is H/zoomratio.

For example, assuming that the height of the $i^{th}$ image is 640p, the width of the $i^{th}$ image is 480p, and the second zoom ratio is 2, it can be learned through calculation based on the foregoing formulas that the height of the zoom area is 320p, and the width of the zoom area is 240p.

Further, to compare the zoom area with the target area by using a uniform standard, the center point of the zoom area coincides with the center point of the target area in some embodiments of this application. It is assumed that coordinates of four vertices of the target area are (X0, Y0), (X0+X, Y0), (X0, Y0+Y), and (X0+X, Y0+Y), the width of the zoom area in the $i^{th}$ image is Cropwidth, and the height of the zoom area in the $i^{th}$ image is Cropheight. In this case, coordinates of four vertices of the zoom area in the $i^{th}$ image are (X0+X/2−Cropwidth/2, Y0+Y/2−Cropheight/2), (X0+X/2+Cropwidth/2, Y0+Y/2−Cropheight/2), (X0+X/2−Cropwidth/2, Y0+Y/2+Cropheight/2), and (X0+X/2+Cropwidth/2, Y0+Y/2+Cropheight/2).

The focusing method provided in embodiments of this application is applied to a scenario of determining the size of the zoom area in the $i^{th}$ image. Because the size of the $i^{th}$ image is fixed, when the user adjusts the electronic device to different zoom ratios, the electronic device may determine zoom areas with different sizes in the $i^{th}$ image based on the different zoom ratios and the size of the $i^{th}$ image. This meets a requirement of flexibly adjusting a size of a zoom area based on a zoom ratio selected by the user.

Step c: The electronic device determines whether the size of the target area in the $i^{th}$ image is greater than or equal to the size of the zoom area in the $i^{th}$ image.

A larger second zoom ratio (zoomratio) indicates a smaller width and a smaller height of the zoom area in the $i^{th}$ image, that is, a smaller the size of the zoom area in the $i^{th}$ image. When a value of the second zoom ratio is small, the size of the target area in the $i^{th}$ image is less than the size of the zoom area in the $i^{th}$ image. When a value of the second zoom ratio is large, the size of the target area in the $i^{th}$ image is greater than or equal to the size of the zoom area in the $i^{th}$ image.

Step d: In a case that the size of the target area in the $i^{th}$ image is greater than or equal to the size of the zoom area in the $i^{th}$ image, the electronic device captures an image of the target area as an $i^{th}$ sub-image.

For example, as shown in FIG. 3, the first preview image includes the following shooting objects: a "person", a "flower", and "text". If the user selects a "person" corresponding to an area 031 as the target object and increases the zoom ratio of the electronic device to a second zoom ratio zoomratio 1, the electronic device may capture N images. The electronic device may determine, based on the area 031 in the first preview image, a target area 032 with P2 as a center point in an $i^{th}$ image shown in FIG. 4A.

As shown in FIG. 4A, the electronic device may calculate a width Cropwidth and a height Cropheight of a zoom area 033 with P1 as a center point in the $i^{th}$ image based on a width W and a height H of the $i^{th}$ image and the second zoom ratio zoomratio 1. Then the electronic device may move the zoom area 033 from the center point P1 to the center point P2, so that a center point of the moved zoom area 033 coincides with the center point of the target area 032.

Figure 5A:
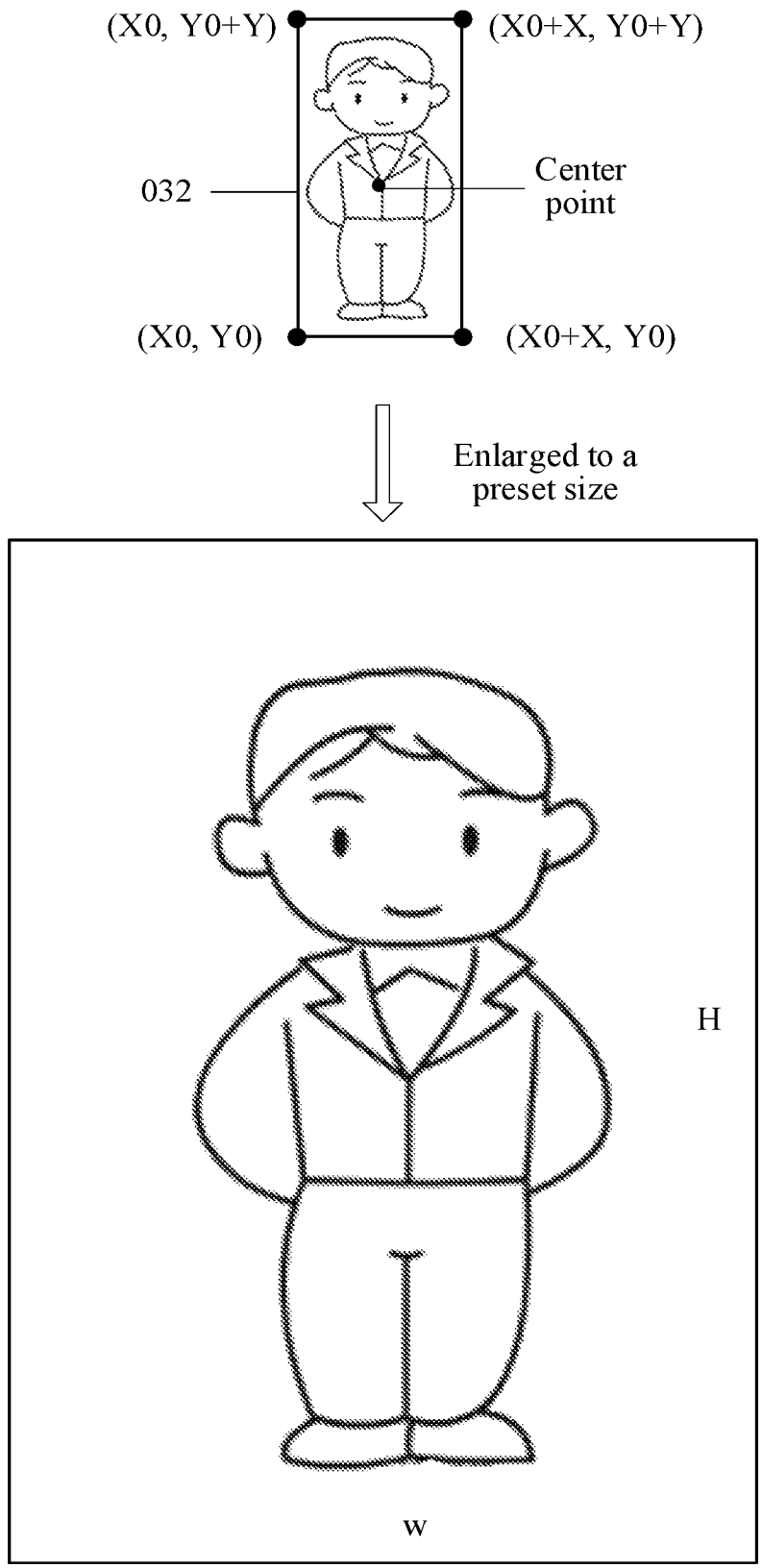
FIG. 5A is a first schematic diagram of capturing a sub-image according to an embodiment of this application.

Further, assuming that coordinates of four vertices of the target area are (X0, Y0), (X0+X, Y0), (X0, Y0+Y), and (X0+X, Y0+Y), coordinates of four vertices of the moved zoom area 033 are (X0+X/2−Cropwidth/2, Y0+Y/2−Cropheight/2), (X0+X/2+Cropwidth/2, Y0+Y/2−Cropheight/2), (X0+X/2−Cropwidth/2, Y0+Y/2+Cropheight/2), and (X0+X/2+Cropwidth/2, Y0+Y/2+Cropheight/2). As shown in FIG. 4A, a size of the target area 032 is greater than a size of the zoom area 033. Therefore, as shown in FIG. 5A, the electronic device may capture an image of the target area 032 from the $i^{th}$ image as an $i^{th}$ sub-image. Then the electronic device may enlarge the $i^{th}$ sub-image to a preset size, where the preset size corresponds to a width of W and a height of H.

Step e: In a case that the size of the target area in the $i^{th}$ image is less than the size of the zoom area in the $i^{th}$ image, the electronic device captures an image of the zoom area as an $i^{th}$ sub-image.

For example, as shown in FIG. 3, the first preview image includes the following shooting objects: a "person", a "flower", and "text". If the user selects a "person" corresponding to an area 031 as the target object and increases the zoom ratio of the electronic device to a second zoom ratio zoomratio 2, where the zoomratio 2 is greater than the zoomratio 1, the electronic device may capture N images. The electronic device may determine, based on the area 031 in the first preview image, a target area 032 with P2 as a center point in an $i^{th}$ image shown in FIG. 4B.

As shown in FIG. 4B, the electronic device may calculate a width Cropwidth and a height Cropheight of a zoom area 033 with P1 as a center point in the $i^{th}$ image based on a width W and a height H of the $i^{th}$ image and the second zoom ratio zoomratio 2. Then the electronic device may move the zoom area 033 from the center point P1 to the center point P2, so that a center point of the moved zoom area 033 coincides with the center point of the target area 032.

Figure 5B:
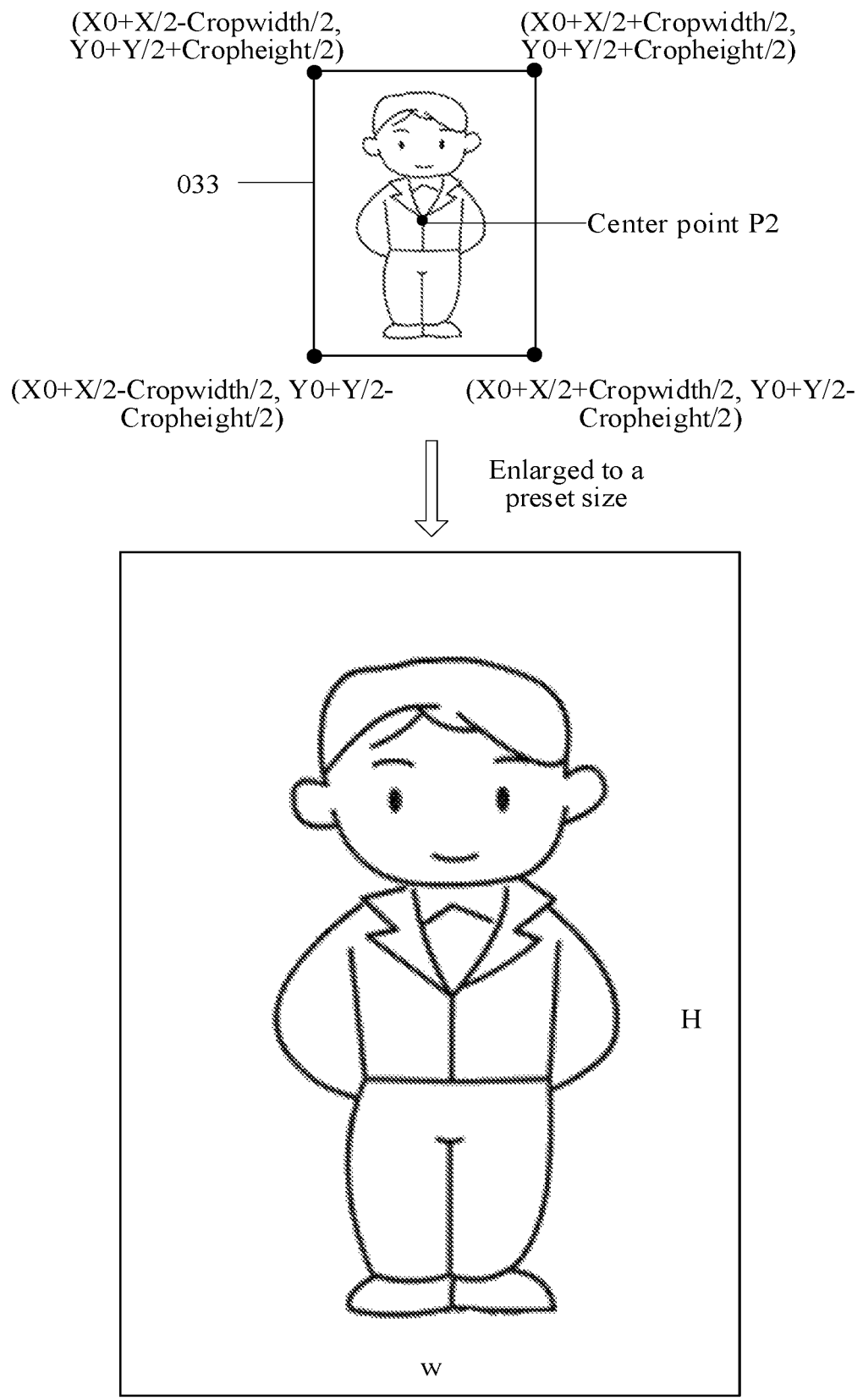
FIG. 5B is a second schematic diagram of capturing a sub-image according to an embodiment of this application.

Further, assuming that coordinates of four vertices of the target area are (X0, Y0), (X0+X, Y0), (X0, Y0+Y), and (X0+X, Y0+Y), coordinates of four vertices of the moved zoom area 033 are (X0+X/2Cropwidth/2, Y0+Y/2−Cropheight/2), (X0+X/2+Cropwidth/2, Y0+Y/2−Cropheight/2), (X0+X/2−Cropwidth/2, Y0+Y/2+Cropheight/2), and (X0+X/2+Cropwidth/2, Y0+Y/2+Cropheight/2). As shown in FIG. 4B, a size of the target area 032 is less than a size of the zoom area 033. Therefore, as shown in FIG. 5B, the electronic device may capture an image of the zoom area 033 from the $i^{th}$ image as an $i^{th}$ sub-image. Then the electronic device may enlarge the $i^{th}$ sub-image to a preset size, where the preset size corresponds to a width of W and a height of H.

The focusing method provided in embodiments of this application is applied to a scenario of capturing the image of the target object from the $i^{th}$ image. The target area and the zoom area that include the image of the target object are determined in the $i^{th}$ image, and the size of the target area is compared with the size of the zoom area, so that a more appropriate area can be selected from the two areas, and an image of the target object can be captured from the area. This facilitates subsequent synthesis of a preview image after zooming.

Step 104: The electronic device synthesizes the N sub-images into a second preview image, and displays the second preview image.

In some embodiments, the synthesizing the N sub-images into a second preview image includes:

(1) The captured N sub-images are enlarged to a preview size to obtain N enlarged sub-images.

In some embodiments, the preview size is equal to a size of the first preview image.

(2) The N enlarged sub-images are processed by using a multi-frame super-resolution algorithm, to obtain N ultra-high-definition sub-images.

The multi-frame super-resolution algorithm is an algorithm for estimating a high-resolution image by inputting a plurality of low-resolution images and obtaining more details through information complementation of the plurality of images based on a degradation model.

In some embodiments, the multi-frame super-resolution algorithm may be a bilateral TV-L1 (BTVL1) super-resolution method. In the bilateral TV-L1 super-resolution method, an optical flow is used to estimate a warping function. In some embodiments, the multi-frame super-resolution algorithm may be any other algorithm. This is not limited in embodiments of this application.

(3) The N ultra-high-definition sub-images are synthesized into the second preview image.

After the N ultra-high-definition sub-images with the preview size are obtained, content of the N ultra-high-definition sub-images is similar. The electronic device may first extract a feature point from each sub-image, then compare feature points, and then combine feature points with best image quality. In comparison with the image of the target object in the first preview image, the second preview image that has a higher resolution and that includes an enlarged image of the target object is obtained through synthesis.

It can be understood that, on the one hand, the N sub-images captured from the N images are enlarged to the preview size, so that the image including the target object can be enlarged; and on the other hand, the N sub-images are processed by using the multi-frame super-resolution algorithm, so that an image resolution can be increased. In this way, the N ultra-high-definition sub-images are synthesized into the second preview image to implement zoom-focusing.

The focusing method provided in embodiments of this application is applied to a zoom-focusing scenario. The first preview image captured based on the first zoom ratio includes the image of the target object. Therefore, when the user increases the zoom ratio of the lens from the first zoom ratio to the second zoom ratio, a plurality of images may be captured based on the first zoom ratio, a sub-image of the target object is captured from each of the plurality of images based on the second zoom ratio, and a plurality of captured sub-images are synthesized into the second preview image. In this way, after zoom-focusing is performed, the image of the target object can be located in a center area of the second preview image, and the user does not need to manually change a location of a terminal device, thereby simplifying a zoom-focusing process.

In some embodiments, in a case that the first preview image captured based on the first zoom ratio is displayed, the electronic device may recognize shooting objects in the first preview image, so that the user selects the target object from the shooting objects. For example, before step 103, the focusing method provided in some embodiments of this application may further include step 105 to step 108.

Step 105: In a case that the first preview image captured based on the first zoom ratio is displayed, the electronic device recognizes S shooting objects from the first preview image.

S is a positive integer.

In some implementations, in a case that the first preview image captured based on the first zoom ratio is displayed, the electronic device may first recognize the S shooting objects from the first preview image, and then receive first input for increasing the first zoom ratio to the second zoom ratio.

For example, the electronic device may detect and recognize each frame of preview image in the background, and recognize a shooting object such as a person, a tree, a flower, text, or an animal in the image by using an image detection and recognition algorithm In addition, the electronic device may calculate a location and a size of each shooting object, and store location information of each shooting object, where location information of a shooting object is used for indicating a location and a size of the shooting object.

In some implementations, in a case that the first preview image captured based on the first zoom ratio is displayed, the electronic device may first receive first input for increasing the first zoom ratio to the second zoom ratio, and then recognize the S shooting objects from the first preview image.

Step 106: The electronic device displays S identifiers in response to the first input.

Each identifier is used for indicating one of the S shooting objects. Identifiers in this application are used for indicating text, symbols, images, and the like of information, controls or other containers may be used as carriers for displaying information, and the identifiers include but are not limited to text identifiers, symbol identifiers, and image identifiers.

For descriptions of the preset zoom ratio, refer to descriptions in the foregoing embodiments.

In a case that an operation of adjusting the zoom ratio of the electronic device by the user is received, if the second zoom ratio is greater than or equal to the preset zoom ratio, it can be determined that the user is performing a zoom-in operation, and a zoom-in degree of a preview image is large.

If a focusing method in the conventional technology is used, the target object may not be located in a center area of a preview interface. Therefore, the focusing method provided in embodiments of this application may be used. Information for prompting the user to select a shooting object is output, so that the user selects a shooting object. Therefore, the electronic device may capture a plurality of images including the shooting object selected by the user, and then obtain, through synthesis, a zoom image in which an image of target object is located in a center area.

In some embodiments, a manner of outputting information for prompting the user to select a shooting object includes at least one of the following:

Manner 1: A prompt user interface (UI) is displayed on the first preview interface. The prompt user interface includes the S identifiers, and each identifier is used for indicating one of the S shooting objects.

For each of the S identifiers, in some implementations, an identifier may be a name of a shooting object, for example, "Flower" or "Person". When the user taps a name, a shooting object corresponding to the name is selected. In another implementation, an identifier may be a selection box displayed on the first preview interface. The selection box is located in an area in which an image of a shooting object is located. When a user taps an area in which a selection box is located, a shooting object corresponding to the area is selected.

It should be noted that an example in which an identifier is a name is used for description in the following embodiments, but does not constitute a limitation on embodiments of this application. During actual implementation, an identifier may be a selection box.

Manner 2: The electronic device plays a prompt tone, for example, sequentially plays a name of each shooting object, so that the user can select the target object based on the prompt tone.

It should be noted that an example in which the target object is selected in the manner 1 is used for description in step 106, but does not constitute a limitation on embodiments of this application. The target object may be selected in the manner 2.

Step 107: The electronic device receives second input performed on a target identifier of the S identifiers.

The target identifier may be used for indicating the target object of the S shooting objects.

In some embodiments, the second input may be tap input, sliding input, touch-and-hold input, or the like performed on the target identifier.

Step 108: The electronic device determines the first area in the first preview image in response to the second input.

Figure 6A:
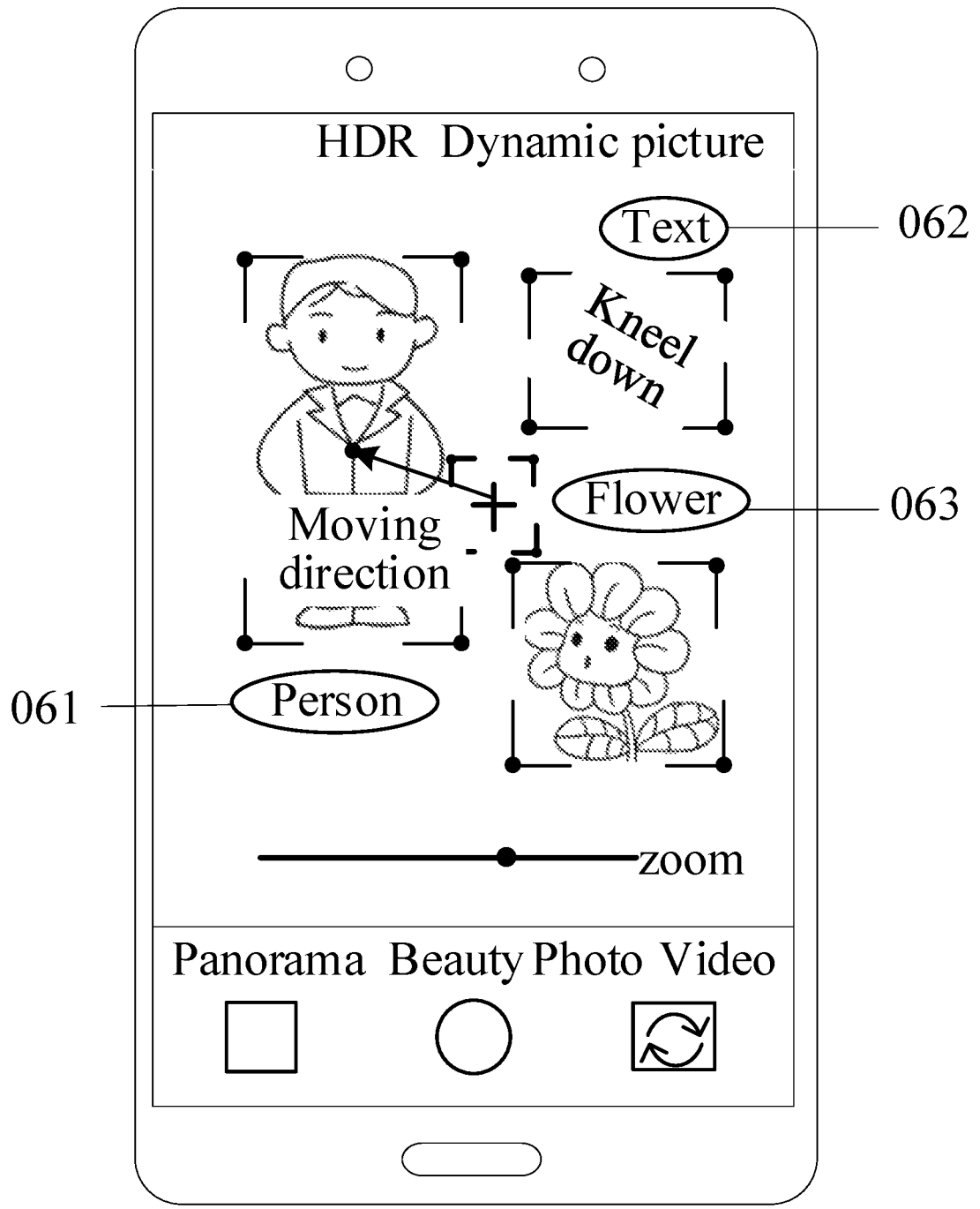
FIG. 6A is a first schematic diagram of an operation of selecting a target object according to an embodiment of this application.

For example, as shown in FIG. 6A, in a case that the first preview image captured based on the first zoom ratio is displayed, the electronic device may recognize the following shooting objects from the first preview image: a "person", a "flower", and "text".

In a case that an operation of adjusting, by the user, the electronic device to the second zoom ratio is received, the electronic device may display an identifier 061 of the "person", an identifier 063 of the "flower", and an identifier 062 of the "text" in the first preview image in a superposed manner, so that the user selects an identifier of the target object from these identifiers. Assuming that the user taps the identifier 061 of the "person", the electronic device may determine the "person" as the target object and capture N images. After the electronic device obtains the second preview image according to the focusing method provided in the foregoing embodiment, the electronic device may display a second preview image shown in FIG. 6B.

Figure 6B:
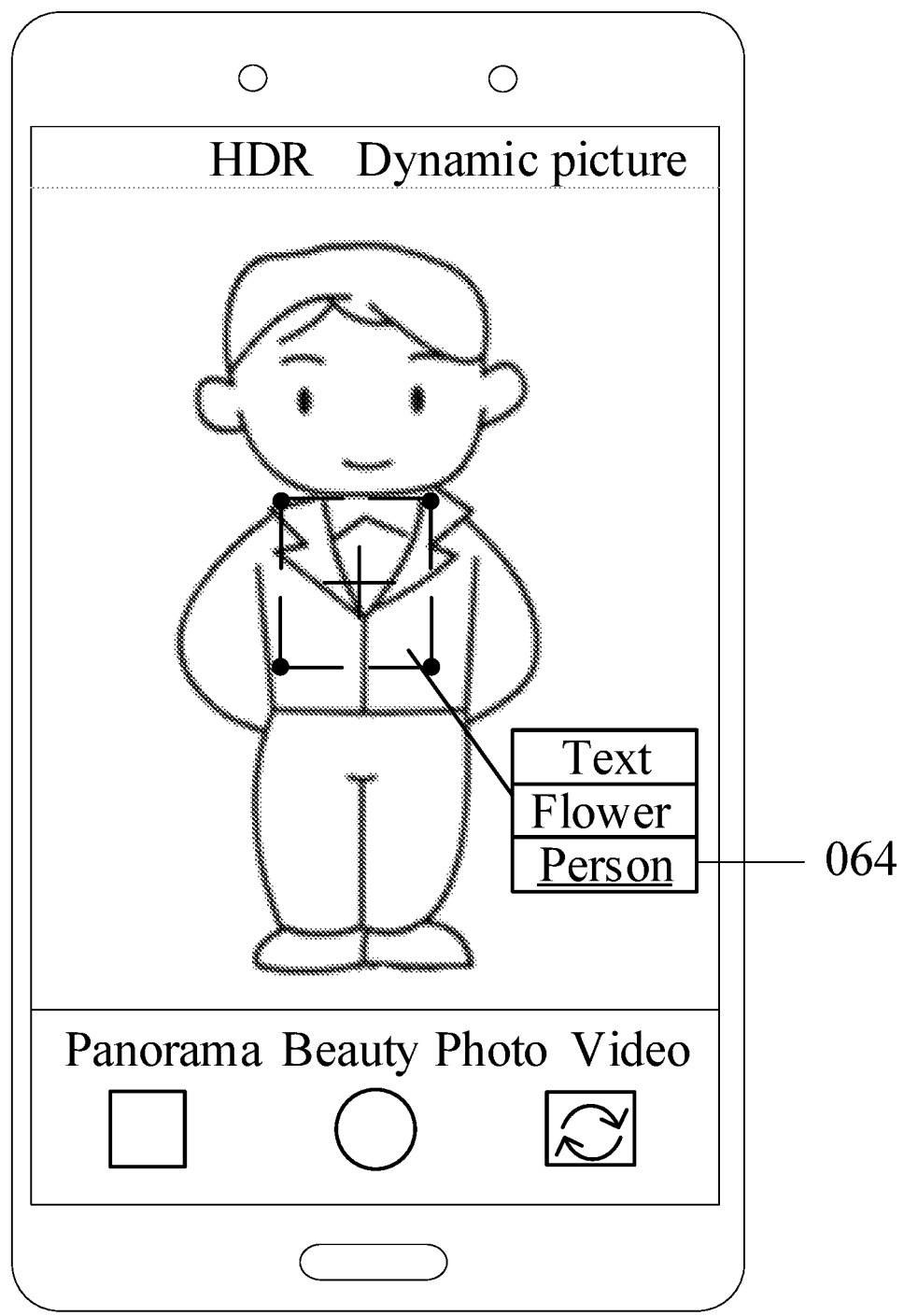
FIG. 6B is a first schematic diagram of displaying a second preview image according to an embodiment of this application.

In addition, the electronic device may further display the following three options shown in FIG. 6B: "Person", "Flower", and "Text". The "Person" option 064 is in bold font to prompt the user that the "person" is the target object. If the user taps "Flower", the electronic device may re-obtain, based on the N images, and display a second preview image in which the target object is the "flower", and display the "Flower" option in bold. If the user taps "Text", the electronic device may re-obtain, based on the N images, and display a second preview image in which the target object is the "text", and display the "Text" option in bold.

The focusing method provided in embodiments of this application is applied to a scenario of prompting the user to select a shooting object. Objects in the first preview image are recognized, and identifiers of the objects are displayed. This can meet a requirement of the user for selecting a target object from the objects. Especially, in a scenario in which a large-screen mobile phone is held with one hand, the user can select any object on a preview interface only by performing input on an identifier corresponding to a shooting object in a small display range. This meets a requirement for quickly obtaining a zoom image of the target shooting object.

In some embodiments, the user may select a plurality of shooting objects in step 101 to step 104. For example, it is assumed that the target object includes P sub-objects, the second preview image includes P sub-images, one sub-object corresponds to one preview sub-image, and P is an integer greater than or equal to 2. Step 107 may be implemented by the following step 107a, and the "displaying the second preview image" in step 104 may be implemented by the following step 104a or step 104b.

Step 107a: The electronic device receives second input performed on P identifiers of the S identifiers.

The P identifiers may be used for indicating the P sub-objects.

Figure 7A:
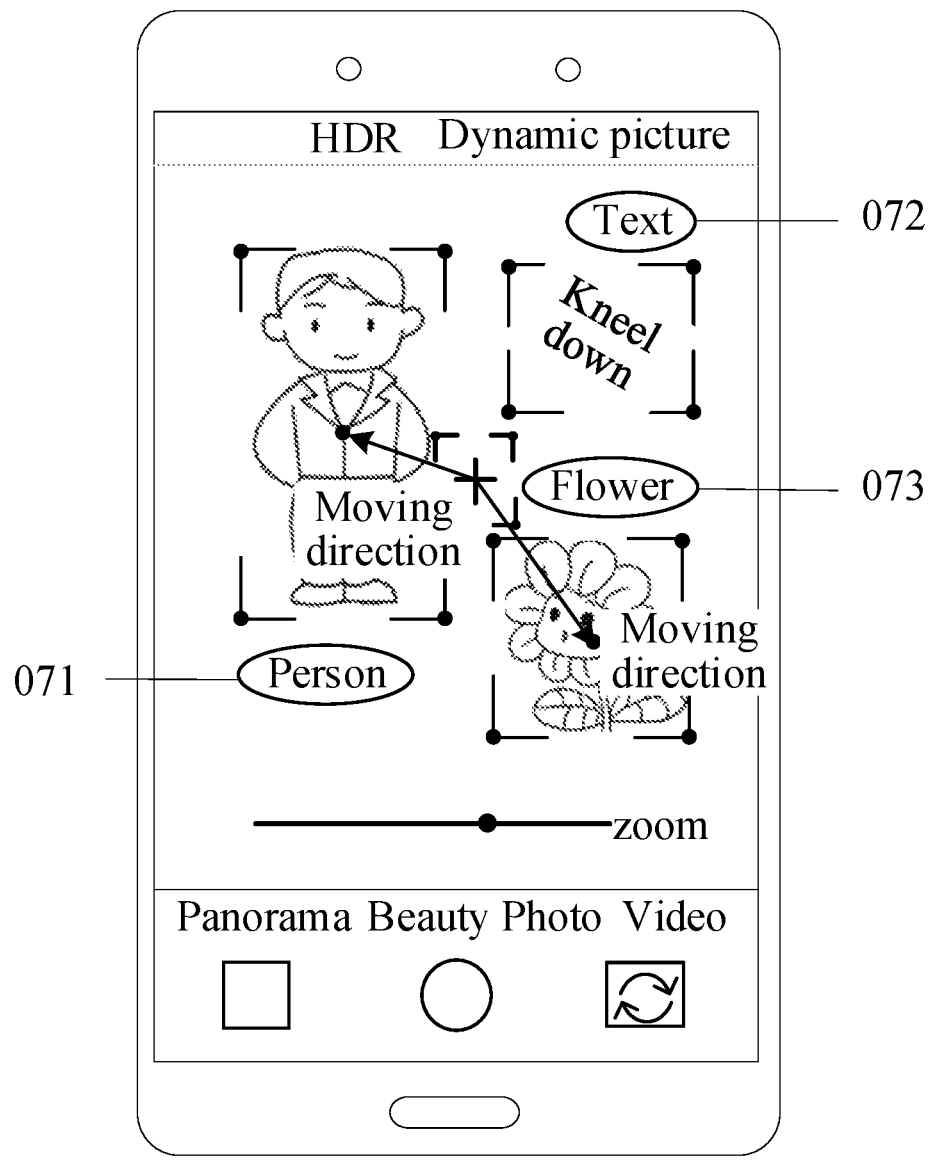
FIG. 7A is a second schematic diagram of an operation of selecting a target object according to an embodiment of this application.

For example, as shown in FIG. 7A, in a case that the first preview image captured based on the first zoom ratio is displayed, the electronic device may recognize the following shooting objects from the first preview image: a "person", a "flower", and "text". In a case that an operation of adjusting, by the user, the electronic device to the second zoom ratio is received, the electronic device may display an identifier 071 of the "person", an identifier 073 of the "flower", and an identifier 072 of the "text" (that is, S=3) in the first preview image in a superposed manner. Assuming that the user taps the identifier 071 of the "person" and the identifier 073 of the "flower" (that is, P=2), the electronic device may determine the "person" and the "flower" as target shooting objects and capture N images.

The electronic device may capture N sub-images corresponding to the "person" from the N images according to the focusing method provided in the foregoing embodiment, and synthesize the N sub-images corresponding to the "person" into a second preview image; and capture N sub-images corresponding to the "flower" from the N images, and synthesize the N sub-images corresponding to the "flower" into another second preview image.

Step 104a: The electronic device sequentially displays each of the P preview sub-images.

In some embodiments of this application, the electronic device may display one of the P preview sub-images at a time in a preset sequence. After displaying the P preview sub-images, the electronic device may sequentially re-display each of the P preview sub-images; or after displaying the P preview sub-images, the electronic device may fixedly display a preview sub-image, for example, the last preview sub-image.

It can be understood that, when the electronic device sequentially displays each of the P preview sub-images, a display proportion of each preview sub-image on a screen can be increased, thereby ensuring that each preview sub-image is displayed in a large size, and the user can conveniently view each preview sub-image.

Step 104b: The electronic device displays a part of the P preview sub-images based on a first proportion, and displays another part of the P preview sub-images based on a second proportion.

The first proportion is greater than the second proportion.

In some embodiments, a display priority of the part of preview sub-images displayed based on the first proportion is higher than a display priority of the another part of preview sub-images displayed based on the second proportion. A display priority of each preview sub-image is preset in a system or is set by the user.

Figure 7B:
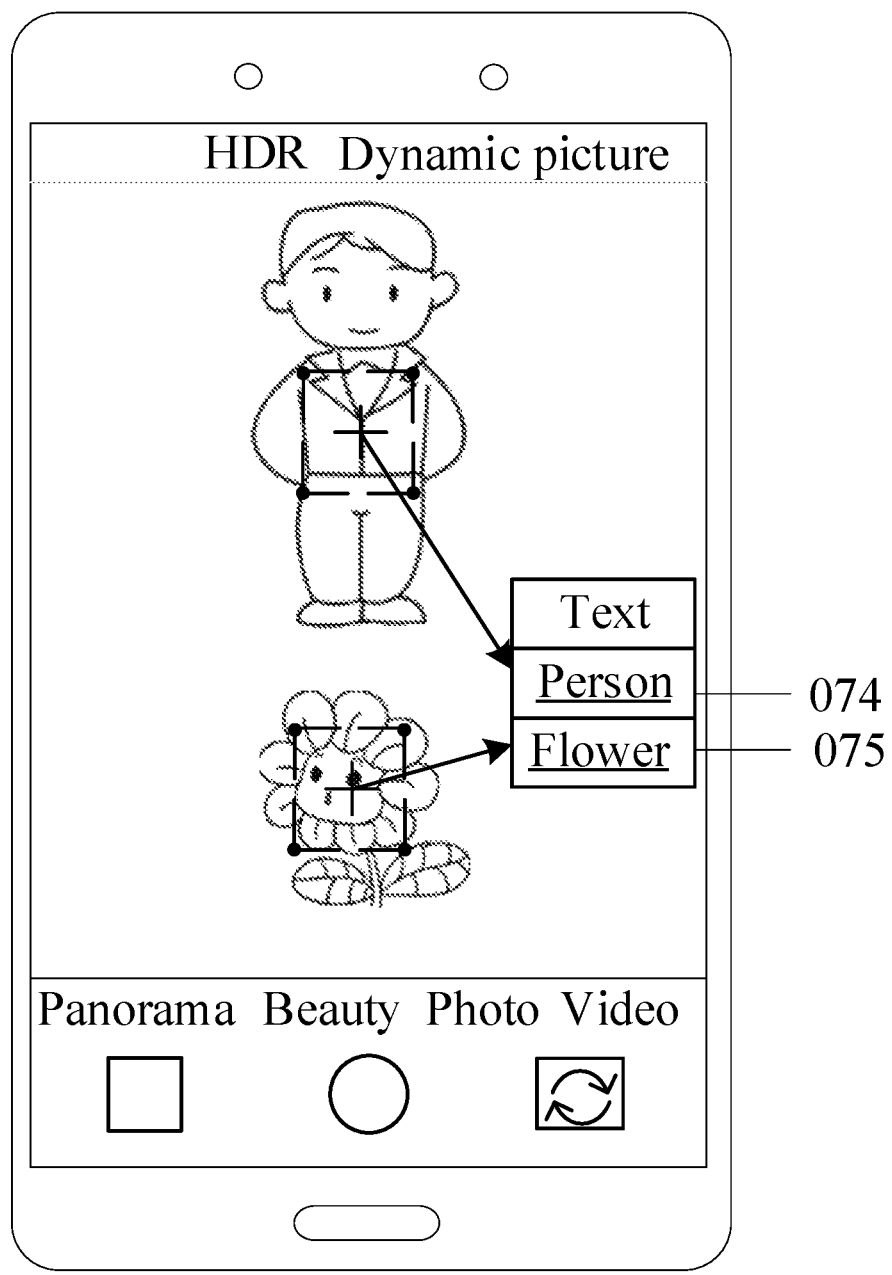
FIG. 7B is a second schematic diagram of displaying a second preview image according to an embodiment of this application.

It is assumed that a display priority of a preview image of the "person" is higher than a display priority of a preview image of the "flower". As shown in FIG. 7B, the electronic device may display the preview image of the "person" at a larger proportion in a first display area of a preview interface, and display the preview image of the "flower" at a smaller proportion in a second display area. Both the first display area and the second display area are preset display areas, and a size of the first display area is greater than a size of the second display area.

In addition, the electronic device may further display the following three options shown in FIG. 7B: "Person", "Flower", and "Text". The "Person" option 074 and the "Flower" option 075 are in bold font to prompt the user that the "person and the "flower" are target objects. If the user taps the "Person", "Flower", and "Text" options, the electronic device may display, in three areas of the preview interface, three second preview images in which target objects are the "person", the "flower", and the "text" respectively, and display the "Person", "Flower", and "Text" options in bold.

It can be understood that, for different shooting objects, because priorities of preview sub-images corresponding to the shooting objects are different, the preview sub-images corresponding to the different shooting objects can be displayed based on different display proportions, so that the user can conveniently view a preview sub-image corresponding to a shooting object with a higher priority.

The focusing method provided in embodiments of this application is applied to a scenario of performing zoom-focusing on a plurality of shooting objects. When the user selects a plurality of shooting objects, the electronic device may capture N images, and obtain, based on the N images, a zoom-focused preview image corresponding to each shooting object, so that zoom-focused preview images can be displayed on the preview interface.

It should be noted that the focusing method provided in the embodiments of this application may be performed by a zoom-focusing apparatus, or by a control module that is in the zoom-focusing apparatus and that is configured to perform the focusing method. In the embodiments of this application, a zoom-focusing apparatus provided in the embodiments of this application is described by using an example in which the zoom-focusing apparatus performs the focusing method.

Figure 8:
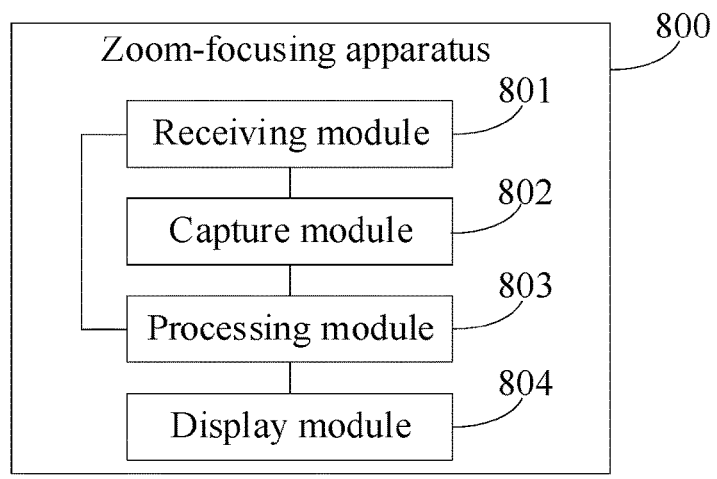
FIG. 8 is a schematic structural diagram of a focusing apparatus according to an embodiment of this application.

As shown in FIG. 8, an embodiment of this application further provides a zoom-focusing apparatus 800. The zoom-focusing apparatus includes a receiving module 801, a capture module 802, a processing module 803, and a display module 804.

The receiving module 801 may be configured to receive first input in a case that the display module 804 displays a first preview image captured based on a first zoom ratio, where the first input is used for triggering an update of the first zoom ratio to a second zoom ratio, the first zoom ratio is less than the second zoom ratio, and the first preview image includes an image of a target object. The capture module 802 may be configured to capture N images based on the first zoom ratio in response to the first input received by the receiving module 801. The processing module 803 may be configured to: capture, based on the second zoom ratio, an image of the target object from each of the N images captured by the capture module 802, to obtain N sub-images, and synthesize the N sub-images into a second preview image. The display module 804 may be configured to display the second preview image obtained by the processing module 803 through synthesis. N is an integer greater than 1.

In some embodiments, the processing module 803 may be configured to: determine, in an $i^{th}$ image of the N images, a target area corresponding to the target object, where a size of the target area is equal to that of a first area, the first area is an area corresponding to the target object in the first preview image, and a value of i ranges from 1 to N; determine a zoom area in the $i^{th}$ image based on the second zoom ratio, a width of the $i^{th}$ image, and a height of the $i^{th}$ image, where a center point of the zoom area coincides with a center point of the target area; and in a case that the size of the target area is greater than or equal a size of the zoom area, capture an image of the target area as an $i^{th}$ sub-image; or in a case that the size of the target area is less than a size of the zoom area, capture an image of the zoom area as an $i^{th}$ sub-image.

In some embodiments, the processing module 803 may be configured to: determine a first ratio of the width of the $i^{th}$ image to the second zoom ratio as a width of the zoom area of the $i^{th}$ image; and determine a second ratio of the height of the $i^{th}$ image to the second zoom ratio as a height of the zoom area of the $i^{th}$ image.

In some embodiments, the processing module 803 may be configured to: before capturing the image of the target object from each of the N images based on the second zoom ratio, recognize S shooting objects from the first preview image, where S is a positive integer. The display module 804 may be further configured to display S identifiers in response to the first input received by the receiving module 801, where each identifier is used for indicating one of the S shooting objects. The receiving module 801 may be further configured to receive second input performed on a target identifier of the S identifiers displayed by the display module 804, where the target identifier is used for indicating the target object. The processing module 803 may be further configured to determine the first area in the first preview image in response to the second input received by the receiving module 801.

In some embodiments, the target object includes P sub-objects, the second preview image includes P sub-images, one sub-object corresponds to one preview sub-image, and P is an integer greater than or equal to 2. The receiving module 801 may be configured to receive second input performed on P identifiers of the S identifiers, where the P identifiers are used for indicating the P sub-objects. The display module 804 may be configured to: sequentially display each of the P preview sub-images; or display a part of the P preview sub-images based on a first proportion, and display another part of the P preview sub-images based on a second proportion, where the first proportion is greater than the second proportion.

In some embodiments, the capture module 802 may be configured to: in a case that the second zoom ratio is greater than or equal to the preset zoom ratio, capture the N images based on the first zoom ratio in response to the first input.

In the zoom-focusing apparatus provided in embodiments of this application, the first preview image captured based on the first zoom ratio includes the image of the target object. Therefore, when a user increases a zoom ratio of a lens from the first zoom ratio to the second zoom ratio, the apparatus may capture a plurality of images based on the first zoom ratio, capture a sub-image of the target object from each of the plurality of images based on the second zoom ratio, and synthesize a plurality of captured sub-images into the second preview image. In this way, after zoom-focusing is performed, the image of the target object can be located in a center area of the second preview image, and the user does not need to manually change a location of a terminal device, thereby simplifying a zoom-focusing process.

The zoom-focusing apparatus in embodiments of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a server, a network attached storage (NAS), a personal computer (PC), a television (TV), a teller machine, or a self-service machine. This is not specifically limited in embodiments of this application.

The zoom-focusing apparatus in embodiments of this application may be an apparatus with an operating system. The operating system may be an Android operating system, may be an iOS operating system, or may be another possible operating system. This is not specifically limited in embodiments of this application.

The zoom-focusing apparatus provided in embodiments of this application is capable of implementing the processes implemented in the method embodiments of FIG. 1 to FIG. 7. To avoid repetition, details are not described herein again.

Figure 9:
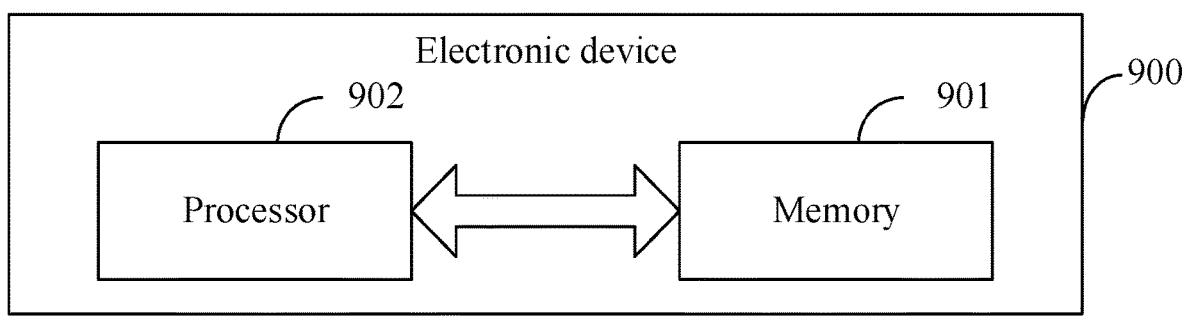
FIG. 9 is a first schematic diagram of hardware of an electronic device according to an embodiment of this application.

As shown in FIG. 9, an embodiment of this application further provides an electronic device 900, including a processor 901, a memory 902, and a program or instructions stored in the memory 902 and capable of running on the processor 901. When the program or instructions are executed by the processor 901, the processes of the foregoing focusing method embodiments are implemented, with the same technical effects achieved. To avoid repetition, details are not described herein again.

It should be noted that the electronic device in embodiments of this application includes the foregoing mobile electronic device and non-mobile electronic device.

Figure 10:
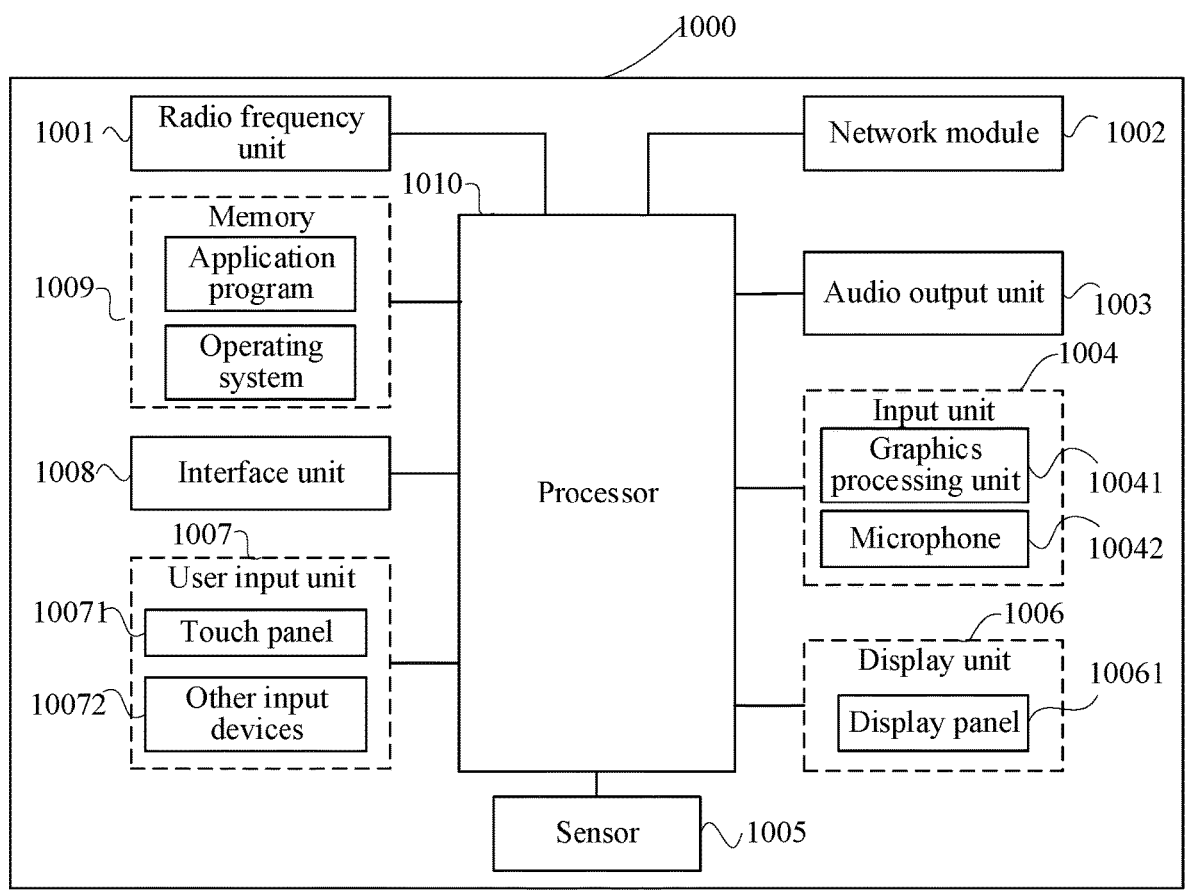
FIG. 10 is a second schematic diagram of hardware of an electronic device according to an embodiment of this application.

FIG. 10 is a schematic diagram of a hardware structure of an electronic device for implementing the embodiments of this application.

The electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the electronic device 1000 may further include a power supply (for example, a battery) that supplies power to each component. The power supply may be logically connected to the processor 1010 by using a power management system, to implement functions such as charging management, discharging management, and power consumption management by using the power management system. The structure of the electronic device shown in FIG. 10 does not constitute a limitation on the electronic device. The electronic device may include more or fewer components than those shown in the figure, or some components may be combined, or there may be a different component layout. Details are not described herein again.

The user input unit 1007 may be configured to receive first input in a case that the display unit 1006 displays a first preview image captured based on a first zoom ratio, where the first input is used for triggering an update of the first zoom ratio to a second zoom ratio, the first zoom ratio is less than the second zoom ratio, and the first preview image includes an image of a target object. The input unit 1004 may be configured to capture N images based on the first zoom ratio in response to the first input received by the user input unit 1007. The processor 1010 may be configured to: capture, based on the second zoom ratio, an image of the target object from each of the N images captured by the input unit 1004, to obtain N sub-images, and synthesize the N sub-images into a second preview image. The display unit 1006 may be configured to display the second preview image obtained by the processor 1010 through synthesis. N is an integer greater than 1.

In some embodiments, the processor 1010 may be configured to: determine, in an $i^{th}$ image of the N images, a target area corresponding to the target object, where a size of the target area is equal to that of a first area, the first area is an area corresponding to the target object in the first preview image, and a value of i ranges from 1 to N; determine a zoom area in the $i^{th}$ image based on the second zoom ratio, a width of the $i^{th}$ image, and a height of the $i^{th}$ image, where a center point of the zoom area coincides with a center point of the target area; and in a case that the size of the target area is greater than or equal a size of the zoom area, capture an image of the target area as an $i^{th}$ sub-image; or in a case that the size of the target area is less than a size of the zoom area, capture an image of the zoom area as an $i^{th}$ sub-image.

In some embodiments, the processor 1010 may be configured to: determine a first ratio of the width of the $i^{th}$ image to the second zoom ratio as a width of the zoom area of the $i^{th}$ image; and determine a second ratio of the height of the $i^{th}$ image to the second zoom ratio as a height of the zoom area of the $i^{th}$ image.

In some embodiments, the processor 1010 may be configured to: before capturing the image of the target object from each of the N images based on the second zoom ratio, recognize S shooting objects from the first preview image, where S is a positive integer. The display unit 1006 may be further configured to display S identifiers in response to the first input received by the user input unit 1007, where each identifier is used for indicating one of the S shooting objects. The user input unit 1007 may be further configured to receive second input performed on a target identifier of the S identifiers displayed by the display unit 1006, where the target identifier is used for indicating the target object. The processor 1010 may be further configured to determine the first area in the first preview image in response to the second input received by the user input unit 1007.

In some embodiments, the target object includes P sub-objects, the second preview image includes P sub-images, one sub-object corresponds to one preview sub-image, and P is an integer greater than or equal to 2. The user input unit 1007 may be configured to receive second input performed on P identifiers of the S identifiers, where the P identifiers are used for indicating the P sub-objects. The display unit 1006 may be configured to: sequentially display each of the P preview sub-images; or display a part of the P preview sub-images based on a first proportion, and display another part of the P preview sub-images based on a second proportion, where the first proportion is greater than the second proportion.

In some embodiments, the input unit 1004 may be configured to: in a case that the second zoom ratio is greater than or equal to the preset zoom ratio, capture the N images based on the first zoom ratio in response to the first input.

In the electronic device provided in embodiments of this application, the first preview image captured based on the first zoom ratio includes the image of the target object. Therefore, when a user increases a zoom ratio of a lens from the first zoom ratio to the second zoom ratio, the device may capture a plurality of images based on the first zoom ratio, capture a sub-image of the target object from each of the plurality of images based on the second zoom ratio, and synthesize a plurality of captured sub-images into the second preview image. In this way, after zoom-focusing is performed, the image of the target object can be located in a center area of the second preview image, and the user does not need to manually change a location of a terminal device, thereby simplifying a zoom-focusing process.

It should be understood that, in embodiments of this application, the input unit 1004 may include a graphics processing unit (GPU) 10041 and a microphone 10042. The graphics processing unit 10041 processes image data of a static picture or a video that is obtained by an image capture apparatus (for example, a camera) in a video capture mode or an image capture mode. The display unit 1006 may include a display panel 10061. The display panel 10061 may be configured in a form of a liquid crystal display, an organic light-emitting diode, or the like. The user input unit 1007 includes a touch panel 10071 and other input devices 10072. The touch panel 10071 is also referred to as a touchscreen. The touch panel 10071 may include two parts: a touch detection apparatus and a touch controller. The other input devices 10072 may include but are not limited to a physical keyboard, a function key (such as a volume control key or an on/off key), a trackball, a mouse, and a joystick. Details are not described herein. The memory 1009 may be configured to store software programs and various data, including but not limited to an application program and an operating system. The processor 1010 may integrate an application processor and a modem processor. The application processor mainly processes an operating system, a user interface, an application program, and the like. The modem processor mainly processes wireless communication. It can be understood that the modem processor may not be integrated in the processor 1010.

An embodiment of this application further provides a readable storage medium. The readable storage medium stores a program or instructions. When the program or instructions are executed by a processor, the processes of the foregoing focusing method embodiments are implemented, with the same technical effects achieved. To avoid repetition, details are not described herein again.

The processor is a processor in the electronic device in the foregoing embodiments. The readable storage medium includes a computer-readable storage medium, for example, a computer read-only memory (ROM), a random access memory (RAM), a magnetic disk, or an optical disc.

An embodiment of this application further provides a chip. The chip includes a processor and a communications interface. The communications interface is coupled to the processor. The processor is configured to run a program or instructions, to implement the processes of the foregoing focusing method embodiments, with the same technical effects achieved. To avoid repetition, details are not described herein again.

It should be understood that the chip provided in embodiments of this application may also be referred to as a system-level chip, a system on chip, a chip system, a system-on-a-chip, or the like.

It should be noted that the terms "include", "comprise", or any other variation thereof in this specification are intended to cover a non-exclusive inclusion, so that a process, a method, an object, or an apparatus that includes a list of elements not only includes those elements but also includes other elements that are not expressly listed, or further includes elements inherent to such a process, method, object, or apparatus. In absence of more constraints, an element preceded by "includes a . . . " does not preclude the existence of other identical elements in the process, method, article, or apparatus that includes the element. In addition, it should be noted that the scope of the method and apparatus in the implementations of this application is not limited to performing functions in the shown or described order, but may also include performing functions in a substantially simultaneous manner or in a reverse order depending on the functions involved. For example, the described method may be performed in an order different from that described, and steps may be added, omitted, or combined. In addition, features described with reference to some examples may be combined in other examples.

According to the foregoing descriptions of the implementations, a person skilled in the art can clearly understand that the methods in the foregoing embodiments may be implemented by using software in combination with a necessary common hardware platform, or may be implemented by using hardware. Based on such an understanding, the technical solutions of this application essentially or the part contributing to the conventional technology may be implemented in a form of a software product. The computer software product may be stored in a storage medium (for example, a ROM/RAM, a magnetic disk, or a compact disc), and includes several instructions for instructing a terminal (which may be a mobile phone, a computer, a server, a network device, or the like) to perform the methods in the embodiments of this application.

The foregoing describes the embodiments of this application with reference to the accompanying drawings. However, this application is not limited to the foregoing implementations. The foregoing implementations are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. A focusing method, comprising:
   receiving a first input when a first preview image is displayed, wherein the first input is used for triggering an update of a first zoom ratio to a second zoom ratio, the first zoom ratio is less than the second zoom ratio, and the first preview image is captured based on the first zoom ratio and comprises an image of a target object;
   capturing N images based on the first zoom ratio in response to the first input when the second zoom ratio is greater than or equal to a preset zoom ratio;
   capturing an image of the target object from each of the N images based on the second zoom ratio, to obtain N sub-images; and
   synthesizing the N sub-images into a second preview image, and displaying the second preview image,
   wherein N is an integer greater than 1.

2. The focusing method according to claim 1, wherein capturing the image of the target object from each of the N images based on the second zoom ratio, to obtain N sub-images comprises:
   determining, in an $i^{th}$ image of the N images, a target area corresponding to the target object, wherein a size of the target area is equal to that of a first area, the first area is an area corresponding to the target object in the first preview image, and a value of i ranges from 1 to N;
   determining a zoom area in the $i^{th}$ image based on the second zoom ratio, a width of the $i^{th}$ image, and a height of the $i^{th}$ image, wherein a center point of the zoom area coincides with a center point of the target area; and
   when the size of the target area is greater than or equal to a size of the zoom area, capturing an image of the target area as an $i^{th}$ sub-image; or
   when the size of the target area is less than a size of the zoom area, capturing an image of the zoom area as an $i^{th}$ sub-image.

3. The focusing method according to claim 2, wherein determining the zoom area in the $i^{th}$ image based on the second zoom ratio, the width of the $i^{th}$ image, and the height of the $i^{th}$ image comprises:
   determining a first ratio of the width of the $i^{th}$ image to the second zoom ratio as a width of the zoom area of the $i^{th}$ image; and
   determining a second ratio of the height of the $i^{th}$ image to the second zoom ratio as a height of the zoom area of the $i^{th}$ image.

4. The focusing method according to claim 2, wherein before capturing the image of the target object from each of the N images based on the second zoom ratio, to obtain N sub-images, the focusing method further comprises:
   recognizing S shooting objects from the first preview image, wherein S is a positive integer;
   displaying S identifiers in response to the first input, wherein each identifier is used for indicating one of the S shooting objects;
   receiving a second input performed on a target identifier of the S identifiers, wherein the target identifier is used for indicating the target object; and
   determining the first area in the first preview image in response to the second input.

5. The focusing method according to claim 4, wherein the target object comprises P sub-objects, the second preview image comprises P sub-images, one sub-object corresponds to one preview sub-image, and P is an integer greater than or equal to 2;
   wherein receiving the second input performed on the target identifier of the S identifiers comprises:
   receiving second input performed on P identifiers of the S identifiers, wherein the P identifiers are used for indicating the P sub-objects; and wherein displaying the second preview image comprises:
sequentially displaying each of the P preview sub-images; or displaying a part of the P preview sub-images based on a first proportion, and displaying another part of the P preview sub-images based on a second proportion, wherein the first proportion is greater than the second proportion.

6. An electronic device, comprising a processor and a memory storing a program or an instruction that is capable of running on the processor, wherein the program or the instruction, when executed by the processor, causes the electronic device to perform:
receiving a first input when a first preview image is displayed, wherein the first input is used for triggering an update of a first zoom ratio to a second zoom ratio, the first zoom ratio is less than the second zoom ratio, and the first preview image is captured based on the first zoom ratio and comprises an image of a target object;
capturing N images based on the first zoom ratio in response to the first input when the second zoom ratio is greater than or equal to a preset zoom ratio;
capturing an image of the target object from each of the N images based on the second zoom ratio, to obtain N sub-images; and
synthesizing the N sub-images into a second preview image, and displaying the second preview image, wherein N is an integer greater than 1.

7. The electronic device according to claim 6, wherein capturing the image of the target object from each of the N images based on the second zoom ratio, to obtain N sub-images comprises:
determining, in an $i^{th}$ image of the N images, a target area corresponding to the target object, wherein a size of the target area is equal to that of a first area, the first area is an area corresponding to the target object in the first preview image, and a value of i ranges from 1 to N;
determining a zoom area in the $i^{th}$ image based on the second zoom ratio, a width of the $i^{th}$ image, and a height of the it image, wherein a center point of the zoom area coincides with a center point of the target area; and
when the size of the target area is greater than or equal to a size of the zoom area, capturing an image of the target area as an $i^{th}$ sub-image; or
when the size of the target area is less than a size of the zoom area, capturing an image of the zoom area as an $i^{th}$ sub-image.

8. The electronic device according to claim 7, wherein determining the zoom area in the $i^{th}$ image based on the second zoom ratio, the width of the $i^{th}$ image, and the height of the $i^{th}$ image comprises:
determining a first ratio of the width of the $i^{th}$ image to the second zoom ratio as a width of the zoom area of the $i^{th}$ image; and
determining a second ratio of the height of the $i^{th}$ image to the second zoom ratio as a height of the zoom area of the $i^{th}$ image.

9. The electronic device according to claim 7, wherein before capturing the image of the target object from each of the N images based on the second zoom ratio, to obtain N sub-images, the program or the instruction, when executed by the processor, causes the electronic device to further perform:
recognizing S shooting objects from the first preview image, wherein S is a positive integer;
displaying S identifiers in response to the first input, wherein each identifier is used for indicating one of the S shooting objects;
receiving a second input performed on a target identifier of the S identifiers, wherein the target identifier is used for indicating the target object; and
determining the first area in the first preview image in response to the second input.

10. The electronic device according to claim 9, wherein the target object comprises P sub-objects, the second preview image comprises P sub-images, one sub-object corresponds to one preview sub-image, and P is an integer greater than or equal to 2;
wherein receiving the second input performed on the target identifier of the S identifiers comprises:
receiving second input performed on P identifiers of the S identifiers, wherein the P identifiers are used for indicating the P sub-objects; and
wherein displaying the second preview image comprises:
sequentially displaying each of the P preview sub-images; or displaying a part of the P preview sub-images based on a first proportion, and displaying another part of the P preview sub-images based on a second proportion, wherein the first proportion is greater than the second proportion.

11. A non-transitory computer-readable storage medium, storing a program or an instruction, wherein the program or the instruction, when executed by a processor, causes the processor to perform:
receiving a first input when a first preview image is displayed, wherein the first input is used for triggering an update of a first zoom ratio to a second zoom ratio, the first zoom ratio is less than the second zoom ratio, and the first preview image is captured based on the first zoom ratio and comprises an image of a target object;
capturing N images based on the first zoom ratio in response to the first input when the second zoom ratio is greater than or equal to a preset zoom ratio;
capturing an image of the target object from each of the N images based on the second zoom ratio, to obtain N sub-images; and
synthesizing the N sub-images into a second preview image, and displaying the second preview image, wherein N is an integer greater than 1.

12. The non-transitory computer-readable storage medium according to claim 11, wherein capturing the image of the target object from each of the N images based on the second zoom ratio, to obtain N sub-images comprises:
determining, in an $i^{th}$ image of the N images, a target area corresponding to the target object, wherein a size of the target area is equal to that of a first area, the first area is an area corresponding to the target object in the first preview image, and a value of i ranges from 1 to N;
determining a zoom area in the $i^{th}$ image based on the second zoom ratio, a width of the $i^{th}$ image, and a height of the $i^{th}$ image, wherein a center point of the zoom area coincides with a center point of the target area; and
when the size of the target area is greater than or equal to a size of the zoom area, capturing an image of the target area as an $i^{th}$ sub-image; or
when the size of the target area is less than a size of the zoom area, capturing an image of the zoom area as an $i^{th}$ sub-image.

13. The non-transitory computer-readable storage medium according to claim 12, wherein determining the zoom area in the $i^{th}$ image based on the second zoom ratio, the width of the $i^{th}$ image, and the height of the $i^{th}$ image comprises:
- determining a first ratio of the width of the $i^{th}$ image to the second zoom ratio as a width of the zoom area of the $i^{th}$ image; and
- determining a second ratio of the height of the $i^{th}$ image to the second zoom ratio as a height of the zoom area of the $i^{th}$ image.

14. The non-transitory computer-readable storage medium according to claim 12, wherein before capturing the image of the target object from each of the N images based on the second zoom ratio, to obtain N sub-images, the program or the instruction, when executed by the processor, causes the processor to further perform:
- recognizing S shooting objects from the first preview image, wherein S is a positive integer;
- displaying S identifiers in response to the first input, wherein each identifier is used for indicating one of the S shooting objects;
- receiving a second input performed on a target identifier of the S identifiers, wherein the target identifier is used for indicating the target object; and
- determining the first area in the first preview image in response to the second input.

15. The non-transitory computer-readable storage medium according to claim 14, wherein the target object comprises P sub-objects, the second preview image comprises P sub-images, one sub-object corresponds to one preview sub-image, and P is an integer greater than or equal to 2;
- wherein receiving the second input performed on the target identifier of the S identifiers comprises:
  - receiving second input performed on P identifiers of the S identifiers, wherein the P identifiers are used for indicating the P sub-objects; and
- wherein displaying the second preview image comprises:
  - sequentially displaying each of the P preview sub-images; or displaying a part of the P preview sub-images based on a first proportion, and displaying another part of the P preview sub-images based on a second proportion, wherein the first proportion is greater than the second proportion.

16. A chip, comprising a processor and a communication interface coupled to the processor, wherein the processor is configured to execute computer instructions to perform the focusing method according to claim 1.

17. The chip according to claim 16, wherein capturing the image of the target object from each of the N images based on the second zoom ratio, to obtain N sub-images comprises:
- determining, in an $i^{th}$ image of the N images, a target area corresponding to the target object, wherein a size of the target area is equal to that of a first area, the first area is an area corresponding to the target object in the first preview image, and a value of i ranges from 1 to N;
- determining a zoom area in the $i^{th}$ image based on the second zoom ratio, a width of the $i^{th}$ image, and a height of the $i^{th}$ image, wherein a center point of the zoom area coincides with a center point of the target area; and
- when the size of the target area is greater than or equal to a size of the zoom area, capturing an image of the target area as an $i^{th}$ sub-image; or
- when the size of the target area is less than a size of the zoom area, capturing an image of the zoom area as an $i^{th}$ sub-image.

* * * * *